(12) United States Patent
Zhang et al.

(10) Patent No.: US 10,235,349 B2
(45) Date of Patent: *Mar. 19, 2019

(54) SYSTEMS AND METHODS FOR AUTOMATED CONTENT GENERATION

(71) Applicant: Google LLC, Mountain View, CA (US)

(72) Inventors: Guannan Zhang, Shanghai (CN); Kai Ye, Shanghai (CN); Yongtai Zhu, Shanghai (CN); Zuo Yan, Seattle, WA (US); Andrew Foster, Naremburn (AU); Jordan Bayliss-McCulloch, Waterloo (AU); Daly Chang, Sunnyvale, CA (US); Ayaka Nonaka, Alameda, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/921,958

(22) Filed: Mar. 15, 2018

(65) Prior Publication Data

US 2018/0203832 A1    Jul. 19, 2018

Related U.S. Application Data

(63) Continuation of application No. 13/890,915, filed on May 9, 2013, now Pat. No. 9,946,695, which is a (Continued)

(51) Int. Cl.
*H04N 1/00* (2006.01)
*H04N 21/00* (2011.01)
(Continued)

(52) U.S. Cl.
CPC .......... *G06F 17/24* (2013.01); *G06F 3/04842* (2013.01); *G06F 17/211* (2013.01);
(Continued)

(58) Field of Classification Search
CPC .. G06F 17/211; G06F 17/212; G06F 17/2229; G06F 17/24; G06F 17/2785;
(Continued)

(56) References Cited

U.S. PATENT DOCUMENTS 6,009,410 A    12/1999  Lemole et al.
7,216,290 B2    5/2007  Goldstein et al.
(Continued)

OTHER PUBLICATIONS

Final Office Action on U.S. Appl. No. 13/890,915 dated Sep. 19, 2017.
(Continued)

*Primary Examiner* — Cesar B Paula
*Assistant Examiner* — Luu-Phuong T Nguyen
(74) *Attorney, Agent, or Firm* — Foley & Lardner LLP

(57) ABSTRACT

A computerized method for automatically generating display content includes receiving a uniform resource locator, wherein the uniform resource locator specifies a landing resource and extracting visual information from the landing resource, wherein the visual information defines one or more images, texts, and colors displayed on the landing resource. The method further includes selecting one or more images, one or more text snippets, and one or more colors based on the visual information extracted from the landing resource, generating a layout for a content item based on one or more of the selected images or selected text snippets, and assembling the content item by applying the selected images, the selected text snippets, and the selected colors to the generated layout.

18 Claims, 11 Drawing Sheets

Related U.S. Application Data continuation of application No. PCT/CN2013/071800, filed on Feb. 22, 2013.

(51) Int. Cl.

| | | |
|---|---|---|
| *H04N 21/4728* | (2011.01) | |
| *H04N 19/00* | (2014.01) | |
| *G06F 17/24* | (2006.01) | |
| *G06T 7/00* | (2017.01) | |
| *G06F 17/30* | (2006.01) | |
| *G06T 1/00* | (2006.01) | |
| *G06F 3/0484* | (2013.01) | |
| *G06F 17/21* | (2006.01) | |
| *G06F 17/22* | (2006.01) | |
| *G06F 17/27* | (2006.01) | |

(52) U.S. Cl.
CPC ...... *G06F 17/2229* (2013.01); *G06F 17/2785* (2013.01); *G06F 17/30047* (2013.01); *G06F 17/30719* (2013.01); *G06T 1/00* (2013.01); *G06T 7/00* (2013.01); *G06F 17/212* (2013.01); *G06F 17/30247* (2013.01); *G06F 17/30253* (2013.01); *G06F 17/30256* (2013.01); *G06F 17/30265* (2013.01); *G06F 17/30268* (2013.01)

(58) Field of Classification Search
CPC ......... G06F 17/30047; G06F 17/30247; G06F 17/30253; G06F 17/30256; G06F 17/30265; G06F 17/30268; G06F 17/30719; G06F 3/04842; G06T 1/00; G06T 7/00; H04N 1/00; H04N 21/00; H04N 21/4728; H04N 19/00
USPC ....................................................... 715/202
See application file for complete search history.

(56) References Cited

U.S. PATENT DOCUMENTS

| | | |
|---|---|---|
| 7,877,384 B2 | 1/2011 | Yu et al. |
| 7,961,986 B1 | 6/2011 | Jing et al. |
| 8,285,982 B2 | 10/2012 | Dobronsky |
| 2005/0065806 A1 | 3/2005 | Harik |
| 2006/0204142 A1 | 9/2006 | West et al. |
| 2007/0019864 A1* | 1/2007 | Koyama ........... G06F 17/30247 382/218 |
| 2008/0040217 A1 | 2/2008 | Dellovo |
| 2008/0071929 A1 | 3/2008 | Motte et al. |
| 2008/0215561 A1 | 9/2008 | Yu et al. |
| 2008/0288338 A1 | 11/2008 | Wiseman et al. |
| 2009/0012863 A1 | 1/2009 | Saephan |
| 2009/0099901 A1 | 4/2009 | Sah et al. |
| 2009/0265334 A1 | 10/2009 | Narayanan et al. |
| 2009/0287996 A1* | 11/2009 | Norimatsu .............. G06T 11/00 715/243 |
| 2010/0046842 A1* | 2/2010 | Conwell ........... G06F 17/30265 382/218 |
| 2010/0088605 A1 | 4/2010 | Livshin et al. |
| 2010/0255906 A1 | 10/2010 | Chen |
| 2011/0029553 A1 | 2/2011 | Bogart et al. |
| 2011/0125731 A1 | 5/2011 | Isozu |
| 2011/0258049 A1 | 10/2011 | Ramer et al. |
| 2011/0307425 A1 | 12/2011 | Wang et al. |
| 2012/0005225 A1 | 1/2012 | Chidlovskii |
| 2012/0030014 A1 | 2/2012 | Brunsman et al. |
| 2012/0092359 A1 | 4/2012 | O'Brien-Strain et al. |
| 2012/0290565 A1 | 11/2012 | Wana et al. |
| 2012/0290566 A1 | 11/2012 | Dasher et al. |
| 2012/0311436 A1 | 12/2012 | Steele et al. |
| 2012/0323563 A1 | 12/2012 | Cai et al. |
| 2013/0124981 A1 | 5/2013 | Chao et al. |
| 2015/0161126 A1 | 6/2015 | Wang et al. |

OTHER PUBLICATIONS

International Search Report and Written Opinion for PCT/CN2013/071800, dated Nov. 28, 2013.

International Search Report for PCT/US2015/2014, dated Jan. 1, 2015.

U.S. Notice of Allowance on U.S. Appl. No. 13/890,915 dated Dec. 13, 2017.

U.S. Office Action on U.S. Appl. No. 13/890,915 dated Mar. 10, 2016.

U.S. Office Action on U.S. Appl. No. 13/890,915 dated Mar. 9, 2017.

U.S. Office Action on U.S. Appl. No. 13/890,915 dated Aug. 10, 2016.

* cited by examiner

SYSTEMS AND METHODS FOR AUTOMATED CONTENT GENERATION

CROSS-REFERENCE TO RELATED PATENT APPLICATIONS

This application is a continuation of, and claims the benefit of and priority under 35 U.S.C. § 120 to U.S. patent application Ser. No. 13/890,915, filed May 9, 2013, which is a continuation of, and claims the benefit of and priority to International Application No. PCT/CN2013/071800, filed Feb. 22, 2013, each of which are hereby incorporated by reference herein in their entirety.

BACKGROUND

In a computerized content delivery network, content providers typically design and provide content items for delivery to a user device via one or more content slots of an electronic resource. Content items typically include display content items and textual content items. Display content items often include images, video, graphics, text, or other visual imagery. Textual content items often include a headline and a short "creative" text. It can be challenging for content providers to create effective and attractive display content items. It can also be challenging for content providers to write the creative text portion of textual content items.

Various templates and stock elements have been used to partially automate the process of creating content items. However, content items created from rigid templates and stock elements are often stale, unattractive, and not well-suited to the particular business, product, or service featured in the content item.

SUMMARY

One implementation of the present disclosure relates to a computerized method for automatically generating display content. The method includes receiving a uniform resource locator, wherein the uniform resource locator specifies a landing resource and extracting visual information from the landing resource, wherein the visual information defines one or more images, texts, and colors displayed on the landing resource. The method further includes selecting one or more images, one or more text snippets, and one or more colors based on the visual information extracted from the landing resource, generating a layout for a content item based on one or more of the selected images or selected text snippets, and assembling the content item by applying the selected images, the selected text snippets, and the selected colors to the generated layout. In some implementations, the visual information further defines one or more fonts displayed on the landing resource, wherein a font is selected based on the visual information, and wherein the assembled content item includes the selected font.

Another implementation of the present disclosure relates to a computerized method for automatically generating textual content. The method includes receiving a uniform resource locator, wherein the uniform resource locator specifies a landing resource and obtaining one or more user reviews, wherein the reviews are user-provided comments relating to a business, product, or service, featured on the landing resource. The method further includes identifying positive phrases in one or more of the reviews, wherein a positive phrase includes a keyword indicative of a positive sentiment, and extracting one or more portions of the reviews, wherein the extracted portions include one or more of the identified positive phrases. In some implementations, the method further includes presenting the extracted portions of the reviews to a content requestor, receiving an input from the content requestor selecting one or more of the extracted portions, and assembling a content item including the extracted portion selected by the content requestor.

Another implementation of the present disclosure is a computerized method for generating a layout for a content item. The method includes receiving one or more images and one or more text snippets, creating a frame for the content item, placing one of the received images in a starting location within the frame, dividing any remaining unused space within the frame into one or more rectangles, and placing one or more of the unplaced text snippets or images into the one or more rectangles. In some implementations, one or more of the rectangles have a display size or aspect ratio based on a display size or aspect ratio of an unused text snippet or an unused image.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION OF ILLUSTRATIVE IMPLEMENTATIONS

Figure 1:
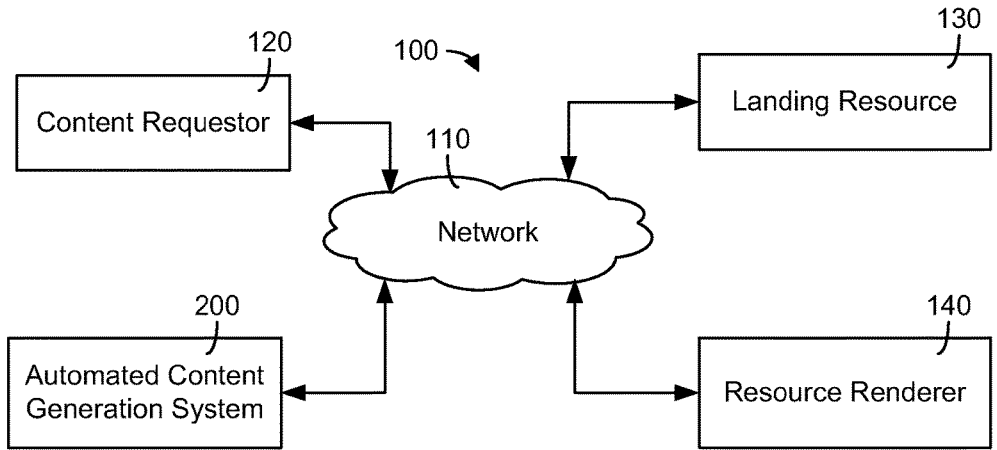
FIG. 1 is a block diagram of a computer system including a network, a content requestor, a landing resource, a resource renderer, and an automated content generation system, according to a described implementation.

Referring generally to the figures, systems and methods for automated display content generation are shown and described. The system and methods described herein may be used to automatically generate unique content items which are tailored to a particular resource provider or landing resource. In some implementations, the content items may be advertisements. The advertisements may be display advertisements such as image advertisements, flash advertisements, video advertisements, text-based advertisements, or any combination thereof. In other implementations, the systems and methods of the present disclosure may be used to generate other types of content (e.g., text content, display content, etc.) which serve various non-advertising purposes.

Content items may be automatically generated to have a visual appearance similar to the visual appearance of a resource (e.g., webpage, intranet resource, local resource, etc.) to which the content item leads when the content item is clicked (i.e., the landing resource). The visual appearance of the landing resource may include one or more colors, fonts, texts, or images which are displayed when the landing resource is rendered (e.g., by a web browser, according to W3C standards, etc.).

In some implementations, a request for automated content generation is received from a content requestor (e.g., an advertiser). The request may include a URL specifying the location of a landing resource. A resource renderer may be used to download render the landing resource. Visual information (e.g., images, colors, fonts, texts, etc.) may be extracted from the landing resource and selected for use in the automatically-generated content item based on various selection criteria.

In some implementations, textual data may be obtained from user reviews of a business, product, or service to which the content item relates. The user reviews may be online (e.g., Internet-based) reviews with or without a numerically-expressed rating (e.g., "1 out of 5," "4 stars," etc.). A sentiment detection system may be used to identify snippets (e.g., phrases, text strings, etc.) of the reviews which express a positive sentiment. The identified snippets may be used to generate purely textual content items or used as textual portions of display content items (e.g., content items including colors, images, etc.).

The systems and methods described herein may be used to generate a layout for display content items based on the selected texts, images, fonts, and colors. Advantageously, the visual appearance of the landing resource may be used to select one or more styles (e.g., image placement, text placement, modern, rustic, square corners, rounded edges, etc.) for the content item. The layout may be selected from a set of flexible templates or freshly created based on a variety of layout generation criteria. This flexible and adaptive design allows for the generation of unique and attractive content items which are tailored to the colors, images, and styles of a particular landing resource.

Referring now to FIG. 1, a block diagram of a computer system 100 is shown, according to a described implementation. Computer system 100 is shown to include a network 110, a content requestor 120, a landing resource 130, a resource renderer 140, and an automated content generation system 200. Computer system 100 may allow content generation system 200 to receive a content generation request from content requestor 120 via network 110. Computer system 100 may further permit content generation system 200 to receive visual information from landing resource 130 and/or resource renderer 140. For example, upon receiving a request for content generation, content generation system 200 may invoke resource renderer 140 to obtain (e.g., download) and render data from landing resource 130. Resource renderer 140 may receive data from landing resource 130 via network 110 and render such data as a snapshot image (e.g., a visual representation of landing resource 130) and/or as a document object model (DOM) tree. The rendered data may be transmitted from resource renderer 140 to content generation system 200 via network 110.

Network 110 may include any type of computer network such as local area networks (LAN), wide area networks (WAN), cellular networks, satellite networks, radio networks, the Internet, or any other type of data network. Network 110 may include any number of computing devices (e.g., computers, servers, routers, network switches, etc.) configured to transmit, receive, or relay data. Network 110 may further include any number of hardwired and/or wireless connections. For example, content requestor 120 may communicate wirelessly (e.g., via WiFi, cellular, radio, etc.) with a transceiver that is hardwired (e.g., via a fiber optic cable, a CAT5 cable, etc.) to a computing device of network 110.

Content requestor 120 may include one or more electronic devices from which a request to generate content items is received. Content requestor 120 may include a computer, a computer system, a server, or any other device capable of submitting a request for content generation. Content requestor 120 may include a user input device (e.g., keyboard, mouse, microphone, touch-screen, tablet, smart phone, etc.) through which a user may input content generation request. Content requestor 120 may submit a content generation request to content generation system 200 via network 110. In some implementations, the content generation request includes a uniform resource locator (URL). The URL may specify a location of a landing resource such as landing resource 130.

Landing resource 130 is defined as the resource to which a user device is directed when the generated content item is "clicked." Landing resource 130 may be a webpage, a local resource, an intranet resource, an Internet resource, or other network resource. Landing resource 130 may be displayed on a user interface device (e.g., a monitor, touch screen, or other electronic display) in response to a user clicking (e.g., with a mouse) or otherwise activating the generated content item. The content item may be clicked or activated using a mouse, keyboard, touch-sensitive display, a microphone, or other user input device capable of converting a user input into an electronic signal. In some implementations, landing resource 130 may provide additional information relating to a product, service, or business featured in the generated content item. For example, landing resource 130 may be a website through which a product or service featured in the generated content item may be purchased.

In some implementations, landing resource 130 may be specified by content requestor 120 as part of a request to generate content items. Landing resource 130 may be specified as a URL which links to (e.g., leads, directs, points, etc.) or otherwise specifies the location of landing resource 130. The URL may be included as part of the content generation request. In some implementations, landing resource 130 may be combined with content requestor 120. For example, landing resource 130 may include data stored on the one or more electronic devices (e.g., computers, servers, etc.) which define content requestor 120. In other implementations, landing resource 130 may be separate from content requestor 120. For example, landing resource 130 may include data stored on a remote server (e.g., FTP servers, file sharing servers, web servers, etc.), combinations of servers (e.g., data centers, cloud computing platforms, etc.), or other data storage devices separate from the devices which define content requestor 120.

Still referring to FIG. 1, system 100 is shown to include a resource renderer 140. Resource renderer 140 may be a hardware or software component capable of interpreting landing resource 130 and creating a visual representation (e.g., image, display, etc.) of landing resource 130 based on such interpretation. For example, landing resource 130 may include marked up content (e.g., HTML, XML, image URLs, etc.) as well as formatting information (e.g., CSS, XSL, etc.). Resource renderer 140 may download the marked up content and formatting information and render landing resource 130 according to World Wide Web Consortium (W3C) standards. Resource renderer 140 may create a "snapshot image" of landing resource 130 and/or construct a document object model (DOM) tree representing landing resource 130.

The snapshot image may be a visual representation of landing resource 130. The snapshot image may illustrate the visual appearance of landing resource 130 as presented on a user interface device (e.g., an electronic display screen, a computer monitor, a touch-sensitive display, etc.) after rendering landing resource 130. The snapshot image may include color information (e.g., pixel color, brightness, saturation, etc.) and style information (e.g., square corners, rounded edges, modern, rustic, etc.) for landing resource 130. In some implementations, the snapshot image may be a picture file having any viable file extension (e.g. .jpg, .png, .bmp, etc.).

The DOM tree may be a hierarchical model of landing resource 130. The DOM tree may include image information (e.g., image URLs, display positions, display sizes, alt text, etc.), font information (e.g., font names, sizes, effects, etc.), color information (e.g., RGB color values, hexadecimal color codes, etc.) and text information for landing resource 130.

In some implementations, resource renderer 140 is part of content generation system 200 whereas in other implementations, resource renderer 140 is a separate component. Resource renderer may prepare the snapshot image and/or DOM tree in response to a rendering request from content generation system 200. Resource renderer 140 may transmit the snapshot image and/or DOM tree to content generation system 200 in response to the rendering request.

Figure 2:
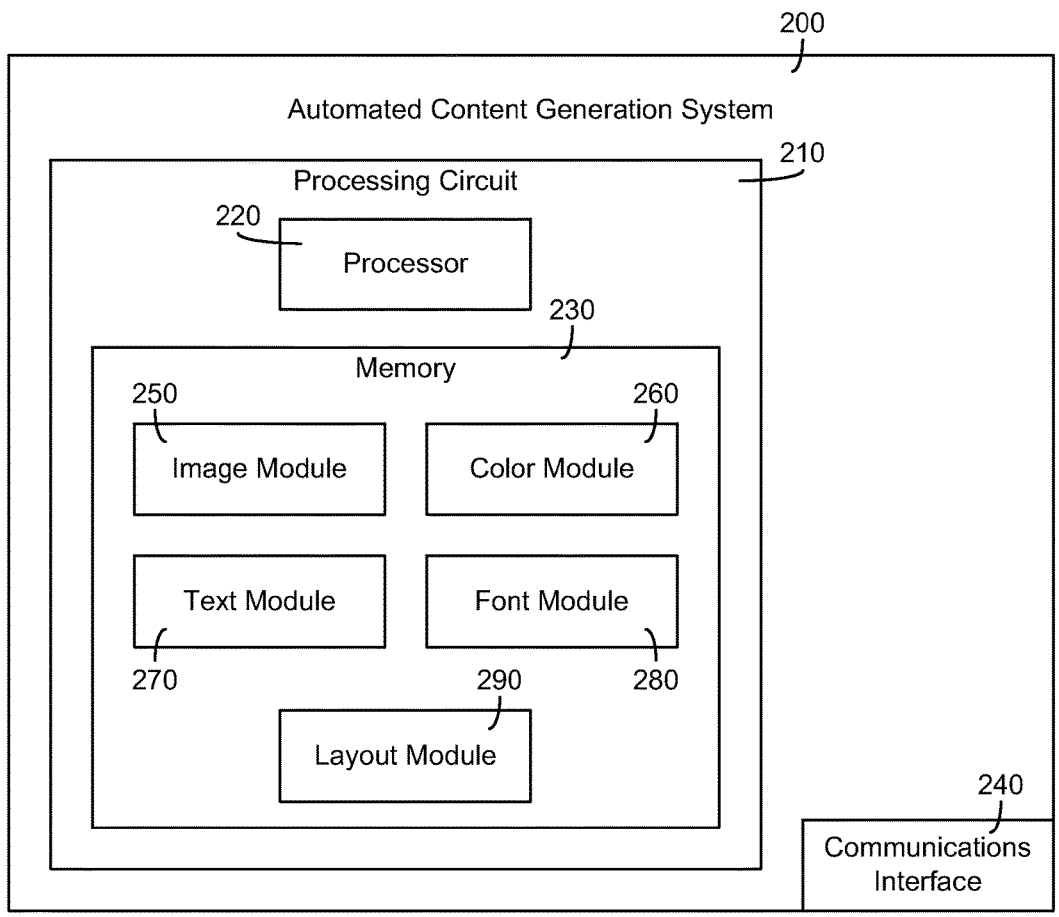
FIG. 2 is a detailed block diagram of the automated content generation system shown in FIG. 1 including an image module, a color module, a text module, a font module, and a layout module, according to a described implementation.

Referring now to FIG. 2, a block diagram of content generation system 200 is shown, according to a described implementation. Content generation system 200 may automatically generate a content item based on the images, colors, texts, fonts, and styles displayed on landing resource 130. The automatically-generated content items may be presented to a content requestor for approval and subsequent usage. Content generation system 200 is shown to include a communications interface 240 and a processing circuit 210 including a processor 220 and memory 230.

Communications interface 240 may include wired or wireless interfaces (e.g., jacks, antennas, transmitters, receivers, transceivers, wire terminals, Ethernet ports, WiFi transceivers, etc.) for conducting data communications with local or remote devices or systems. For example, communications interface 240 may allow system 200 to communicate with network 110, content requestor 120, landing resource 130, and/or resource renderer 140.

Still referring to FIG. 2, processing circuit 210 is shown to include a processor 220 and memory 230. Processor 220 may be implemented as a general purpose processor, an application specific integrated circuit (ASIC), one or more field programmable gate arrays (FPGAs), a CPU, a GPU, a group of processing components, or other suitable electronic processing components. Memory 230 may include one or more devices (e.g., RAM, ROM, Flash memory, hard disk storage, etc.) for storing data and/or computer code for completing and/or facilitating the various processes, layers, and modules described in the present disclosure. Memory 230 may comprise volatile memory or non-volatile memory. Memory 230 may include database components, object code components, script components, or any other type of information structure for supporting the various activities and information structures described in the present disclosure.

In a described implementation, memory 230 is communicably connected to processor 220 via processing circuit 210 and includes computer code (e.g., the modules stored in memory) for executing one or more processes described herein. Memory 230 is shown to include an image module 250, a color module 260, a text module 270, a font module 280, and a layout module 290.

Image module 250 may select an image for use in an automatically-generated content item. The image may be a business logo (e.g., trademark, service mark, etc.), a picture of a featured product, or other prominent image. The image may be selected from a set of images displayed on landing resource 130 or retrieved from a separate database. In some implementations, image module 250 may query a logo database to obtain or locate previously saved logo or product images. Image module 250 may parse each node of the DOM tree created by resource renderer 140 and extract the image metadata (e.g., image URL, display position, display size, alt text, etc.) for images displayed on landing resource 130. Image module 250 may search the image metadata for logo indicators such as a special logo markup (e.g., HTML or CSS tags), an image display position at the top of the resource, an image filename containing the keyword "logo," or an image size (e.g., height or width) with respect to a height or width of landing resource 130. Image module 250 is described in greater detail in reference to FIG. 3.

Still referring to FIG. 2, content generation system 200 is shown to include a color module 260. Color module 260 may generate a color scheme for the display content. In some implementations, color module 260 may select colors for the background, headline, description, button background, and/or button text of the content item. The color scheme may include one or more colors corresponding to the colors displayed on landing resource 130. Color module 260 may use the snapshot image of landing resource 130 and/or the DOM tree produced by resource renderer 140 in selecting colors for the content item. In some implementations, color module 260 may extract several color clusters from the snapshot image using a clustering technique such as k-means clustering. Color module 260 is described in greater detail in reference to FIG. 4.

Still referring to FIG. 2, content generation system 200 is shown to include a text module 270. In some implementations, text module 270 may be used to automatically create a textual portion of the display content generated by content generation system 200 (e.g., textual description, headline, etc.). In other implementations, text module 270 may be used to independently generate purely textual content items. In some implementations, text module 270 uses the DOM tree or snapshot image of landing resource 130 to create a summary of the text displayed on landing resource 130. In other implementations, text module 270 retrieves textual data from supplemental sources in addition to or in place of landing resource 130. For example, text module 270 may receive textual data from user-created reviews of a business, product, or service. The reviews may be retrieved from an Internet resource (e.g., website) on which users are permitted to post or submit comments, reviews, or other text related to a particular business, product, or service. The URL of landing resource 130 may be used to specify the location of such reviews and/or direct text module 270 to a particular resource.

Text module 270 may include a sentiment detection system capable of determining whether a review is positive or negative with or without a numerically expressed rating (e.g., "1 out of 5," "4 stars," etc.). The sentiment detection system may parse the language of the review, looking for positive-indicating adjectives (e.g., excellent, good, great, fantastic, etc.). The sentiment detection system may then select or extract a relatively short snippet of the review that includes such positive phrases for inclusion in the generated content item. Text module 270 is described in greater detail in reference to FIG. 5.

Still referring to FIG. 2, content generation system 200 is shown to include a font module 280. Font module 280 may select a font or font family for use in the generated content item. In some implementations, landing resource 130 may include font information as HTML, CSS, or XML font tags. Font module 280 may receive the rendered DOM tree from resource renderer 140 and extract one or more fonts (e.g., font faces, font families, etc.) from the hierarchical model. Font module 280 may extract the font information from a rendered DOM tree or from landing resource 130 directly.

In some implementations, font module 280 may separate the extracted fonts into multiple categories based on font size. For example, font module 280 may create a first category for large fonts (e.g., greater than 20 pt., greater than 16 pt., etc.) and a second category for relatively smaller fonts. Font size may be extracted from the rendered DOM tree or from landing resource 130 directly. In some implementations, multiple fonts or font families may be selected. For example, one font may be selected for use with a headline of the generated content item while another font may be selected for use with a descriptive portion or button text of the content item.

Still referring to FIG. 2, content generation system 200 is further shown to include a layout module 290. In a described implementation, layout module 290 uses the selected texts, images, colors, and fonts to generate a layout for the content item. Layout module 290 may select a layout from a set of predefined layout options (e.g., template layouts) or generate a new layout (e.g., not based on a template). Layout module 290 may generate a layout based on the display sizes of the images selected by image module 250 as well as the length of the text selected by text module 270. Layout module 290 may resize the image(s) and/or adjust the text to fit a selected layout or adjust the layout to fit the selected images and/or text.

In some implementations, layout module 290 may use landing resource 130 to determine a style, business category, or appearance for the content item. For example, layout module 290 may determine a business category of the landing resource 130 (e.g., fast food, automotive parts, etc.), a style of landing resource 130 (e.g., modern or rustic), and a usage of shapes (e.g., 90 degree corners, rounded corners, etc.) displayed on landing resource 130. Layout module 290 may invoke an external database to retrieve business category information based on the URL of landing resource 130. Layout module 290 is described in greater detail in reference to FIG. 6.

Figure 3:
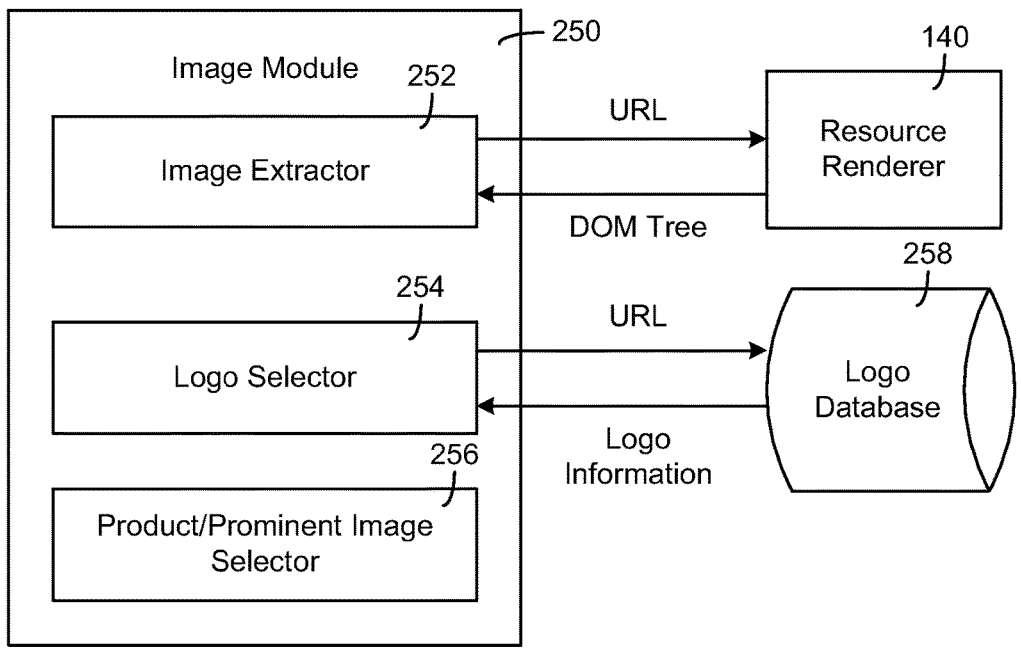
FIG. 3 is a detailed block diagram of the image module shown in FIG. 2 including an image extractor, logo selector, and product/prominent image selector, according to a described implementation.

Referring now to FIG. 3, a block diagram of image module 250 is shown, according to a described implementation. Image module 250 may select one or more images for use in the generated content item. The selected images may include logo images, product images, or other prominent images. Image module 250 may select one or more images from a set of images displayed on landing resource 130. Image module 250 is shown to include an image extractor 252, a logo selector 254, and a product/prominent image selector 256.

Image extractor 252 may generate a list, set, or compilation of images displayed on landing resource 130. In some implementations, the displayed images may be extracted from landing resource 130 and stored in an images database. The extracted images may be stored in conjunction with metadata for each image. For example, image extractor 252 may provide resource renderer 140 with the URL of landing resource 130. Resource renderer 140 may generate a DOM tree of landing resource 130 and send the DOM tree to image extractor 252. Image extractor 252 may extract image information from the rendered DOM tree. The extracted image information may include image metadata such as image URLs, display positions, display sizes, alt text, filenames, file sizes, or any other pertinent image information or statistics. The list of images generated by image extractor 252 and the information associated with each extracted image may be used to select one or more images for inclusion in the automatically-generated content item.

Still referring to FIG. 3, image module 250 is shown to include a logo selector 254. Logo selector 254 may select a logo image for use in the generated content item. A logo image may be a trademark, a business logo, a product logo, a company logo, or any other image associated with a particular product, service, or organization. In some implementations, logo selector 254 may query logo database 258 to obtain or identify logo images. Logo database 258 may be a media table containing previously saved logo information. For example, a logo image may have been previously identified by a content requestor or advertiser as part of a previous content generation request or by confirming a logo image in a previously generated content item.

Logo database 258 may be organized by URL or domain name such that logo information may be readily retrieved by specifying a URL. For example, logo selector 254 may provide logo database 258 with the URL of landing resource 130. In some implementations, logo database 258 may provide logo selector 254 with a corresponding URL specifying the location of a logo image. The logo image may be stored within logo database 258, on a local resource (e.g., a separate images database, a local media server, etc.), or a remote resource (e.g., an Internet resource, etc.). In some implementations, logo database 258 may specify a particular image (e.g. by URL) of the images extracted from landing resource 130. Alternatively, logo database 258 may specify an image other than the images extracted from landing resource 130.

In some implementations, logo database 258 may contain no logo information for landing resource 130 or the domain associated with landing resource 130. When no logo information is available, logo selector 254 may attempt to identify logo images using other techniques. In some implementations, logo selector 254 may search landing resource 130 or the metadata associated with the extracted images for a special logo markup tag. One example of a special logo markup tag is:

<link rel="example-logo-markup" href="somepath/image.png"> where the text string 'example-logo-markup' is used as a keyword identifying a logo image. In other implementations, different text strings or keywords may be used. The particular text string or keyword may be selected based on the URL of landing resource 130, the domain associated with landing resource 130, a business entity associated with landing resource 130, or any other criteria. Any number of logo markup keywords may be used to identify a potential logo image. Logo selector 254 may extract the 'href' attribute value (e.g., somepath/image.png) as a URL specifying athe location of a potential logo image.

In some implementations, logo selector 254 may search the image metadata compiled by image extractor 252 (e.g., HTML tags, URLs, display positions, display sizes, alt text, filenames, file sizes.) in attempting to identify a logo image. For example, logo selector 254 may search for a text string or keyword indicative of a logo image (e.g. "logo") in the image filenames, alt text, or title attributes.

Logo selector 254 may filter the search results to remove third party logo images (e.g., logos for products or entities other than the primary product, business, or service featured on landing resource 130). For example, logo selector 254 may remove images from the search results which contain one or more third party keywords. The third party keywords may include domain names, partial domain names (e.g., excluding the domain type suffix), entity names, or other words indicative of a third party logo. A list of third party keywords may be generated manually, automatically, or through a separate filter selection process. In some implementations, the initial metadata search for logo images may include logical criteria (e.g., "logo" AND NOT "example-third-party-keyword") such that third party logo images are not returned by the initial metadata search. In such implementations, additional keyword filtering may be unnecessary.

In some implementations, logo selector 254 may further filter the search results to remove images which are unacceptable for reasons other than third party content. For example, logo selector 254 may remove images having a display size (e.g., height, width, area, etc.) larger than a threshold value. The threshold value may be measured in pixels (e.g., 50 pixels, 200 pixels, 500 pixels, etc.), em (e.g., with respect to a defined font size), inches, square pixels, square inches, or any other unit measuring display length, display size, or display area. In some implementations, logo selector 254 may remove images having a display size smaller than a threshold value. For example, logo selector 254 may remove images having a display width or display height less than 25 pixels, 50 pixels, 100 pixels, etc. Advantageously, filtering images having a display size smaller than a threshold value may eliminate border images and small icons from the set of images extracted by image extractor 252. In some implementations, images may be filtered using various image processing methodology (e.g., a color histogram, etc.) to eliminate simple solid or gradient background images.

Still referring to FIG. 3, image module 250 is further shown to include a product/prominent image selector 256. Image selector 256 may identify a product image or other prominent image (e.g., other than a logo image) for use in the automatically-generated content item. In some implementations, image selector 256 may rank the images extracted by image extractor 252 based on a salience score assigned to each image. A salience score may be assigned to an image based on a relative importance or prominence with which the image is displayed on landing resource 130. For example, the salience score for an image may depend on the vertical placement of the image (e.g., top of the page, middle of the page, bottom of the page, etc.), the display size of the image (e.g., display height, display width, etc.), whether the image is centered on landing resource 130, and/or other image salience scoring criteria.

One example of an image salience scoring algorithm is:

$$\text{Salience} = \alpha * \text{sigmoid}_1(\text{position}_y, y_0, dy) + \beta * \text{sigmoid}_2(\text{width}, w_0, d_{size}) * \text{sigmoid}_2(\text{height}, h_0, d_{size}) + \delta * \text{central\_alignment}$$

In some implementations, $\alpha$, $\beta$, and $\delta$ are all positive and sum to 1.0.

$\text{Sigmoid}_1(\text{position}_y, y_0, dy)$ may be a sigmoid function ranging from 1.0 at $\text{position}_y=0$ (e.g., the top of landing resource 130) to 0.0 at $\text{position}_y=\infty$ (e.g., the bottom of landing resource 130, significantly distant from the top of landing resource 130, etc.). $y_0$ may be the point at which $\text{Sigmoid}_1=0.5$ and dy may control the slope of the sigmoid function around $y_0$. $\text{Sigmoid}_2$ may be defined as $(1-\text{Sigmoid}_1)$ and central_alignment may be a measure of whether the image is centrally aligned (e.g., horizontally centered) on landing resource 130. Central_alignment may be 1.0 if the image is perfectly centered and may decrease based on the distance between the center of the image and the horizontal center of landing resource 130.

In some implementations, product/prominent image selector 256 may rank the images extracted by image extractor 252 based on a relevance score assigned to each image. A relevance score may be assigned to an image by comparing the image (e.g., image metadata, image content, etc.) with a list of keywords based on the URL of landing resource 130. The list of keywords may be based on a business classification, business type, business category, or other attributes of the business or entity associated with landing resource 130. The relevance score may indicate the likelihood that a particular image represents the business, product, or service featured in the automatically-generated content item.

In some implementations, image module 250 may generate multiple lists of images. A first list generated by image module 250 may be a list of logo images selected by logo selector 254. A second list generated by image module 250 may be a list of product and/or prominent images selected by product/prominent image selector 256. The lists of images may include attributes associated with each image such as image width, image height, salience score, relevance score, or other image information. The lists of images may be used by layout module 290 in selecting images for inclusion in the automatically-generated content item.

Figure 4:
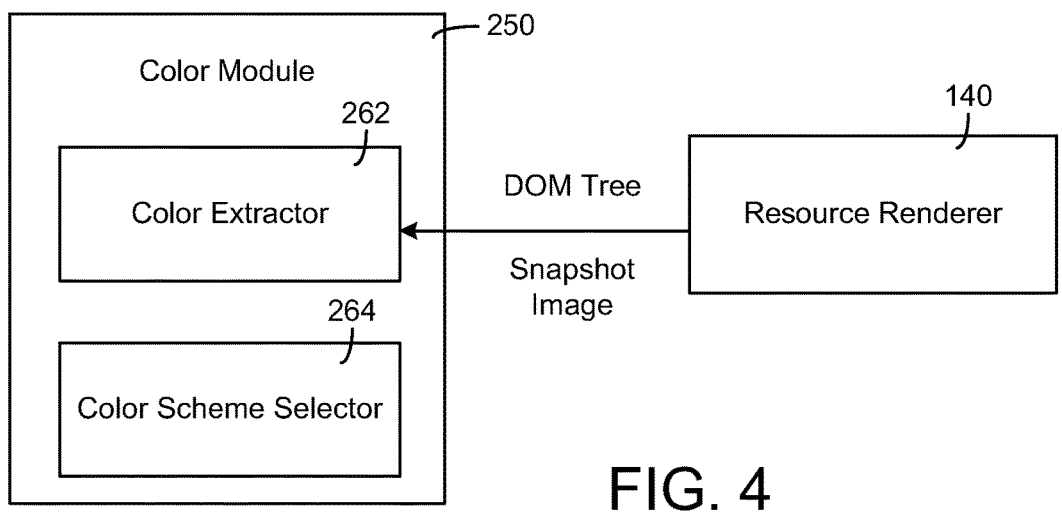
FIG. 4 is a detailed block diagram of the color module shown in FIG. 2 including a color extractor and a color scheme selector, according to a described implementation.

Referring now to FIG. 4, a block diagram of color module 260 is shown, according to a described implementation. Color module 260 may generate a color scheme for the automatically-generated content item. Color module 260 may select colors for the background, headline, description, button background, and/or button text of the content item. Advantageously, the color scheme may include one or more colors corresponding to the colors displayed on landing resource 130. Color module 260 is shown to include a color extractor 262 and a color scheme selector 264.

In some implementations, color extractor 262 receives the rendered DOM tree of landing resource 130 from resource renderer 140. The DOM tree may provide color extractor 262 with images, background colors (e.g., hexadecimal color codes, color names, etc.), text colors, and/or other items displayed on landing resource 130. Color extractor 262 may estimate the dominant colors of landing resource 130 based on the information provided by the DOM tree.

In some implementations, color extractor 262 receives a snapshot image of landing resource 130 from resource renderer 140. The snapshot image may be received in addition to or in place of the rendered DOM tree. Advantageously, the snapshot image may provide color extractor 262 with supplemental color information not readily apparent from analyzing the DOM tree. For example, the snapshot image may accurately illustrate the visual appearance of landing resource 130 including actual display sizes of HTML elements and style information rendered by JAVASCRIPT. The snapshot image may be received as an image file (e.g., .png, .bmp, .jpg, etc.) illustrating the rendered appearance of landing resource 130.

Color extractor 262 may extract dominant colors from the snapshot image. In some implementations, color extractor 262 extracts dominant colors from the snapshot image using a clustering technique such as k-means clustering. For example, color extractor 262 may treat each pixel of the snapshot image as an independent color measurement (e.g., an independent k-means observation). The color of each pixel may be represented using RGB color values ranging from zero saturation (e.g., 0) to complete saturation (e.g., 255) for each primary color of light (e.g., red, green, and blue). Color extractor 262 may use a set of predefined colors (e.g., RGB(0, 0, 0), RGB(225, 0, 0), RGB(0, 255, 0), RGB(0, 0, 225), RGB(255, 255, 0), RGB(255, 0, 255), RGB(0, 255, 255), RGB(255, 255, 255), etc.) as initial cluster means and assign each pixel to the cluster with the mean value closest to the RGB color value of the pixel.

For example, the RGB color value of each pixel may be compared with each cluster mean using the following formula: $|R_{mean}-R_{pixel}|+|G_{mean}-G_{pixel}|+|B_{mean}-B_{pixel}|=$difference. In some implementations, a new mean may be created if the difference between the RGB color value for a pixel and the closest cluster mean exceeds a threshold value (e.g. $|R_{mean}-R_{pixel}|+|G_{mean}-G_{pixel}|+|B_{mean}-B_{pixel}|>$threshold). After assigning each pixel to the closest cluster (e.g., the cluster having a mean value closest to the color value for the pixel), each mean cluster value may be re-computed based on the RGB color values of the pixels in each cluster. In some implementations, successive iterations may be performed by reassigning pixels to the closest cluster until the clusters converge on steady mean values or until a threshold number of iterations has been performed.

Color extractor 262 may rank the refined color clusters based on the number of pixels in each cluster. For example, the color cluster with the most pixels may be ranked as expressing the most dominant color, the color cluster with the second most pixels may be ranked as expressing the second most dominant color, etc. In some implementations, color extractor 262 may assign a weight to each color based on the number of pixels in the corresponding color cluster relative to the total number of pixels in the snapshot image. Color extractor 262 may generate a list of extracted colors (e.g., RGB values) along with a weight or dominance ranking of each color.

Advantageously, k-means clustering may provide a color extraction technique which does not increase in time complexity as a function of the square of the number of pixels in the snapshot image (e.g., time_complexity$\neq K*n_{pixels}^{2}$). Instead, k-means clustering has a time complexity proportional to the number of pixels multiplied by the number of clustering iterations (e.g. time_complexity=$K*n_{pixels}*$iterations). The linear relationship between pixel number and time complexity with k-means clustering may result in an improved computation time over other color extraction techniques, especially when extracting colors from relatively large snapshot images.

In some implementations, color extractor 262 filters advertisements and/or other third party content before extracting dominant colors from the snapshot image. For example, color extractor 262 may maintain or receive a list of third party content providers. Color extractor 262 may parse the rendered DOM tree for content items originating from a third party content provider and eliminate such third party content as well as any dependent content from the rendered DOM tree. Color extractor 262 may also remove such content from the snapshot image based on the runtime position and display size of the third party content items.

Still referring to FIG. 4, color module 260 is further shown to include a color scheme selector 264. Color scheme selector 264 may use the colors determined by color extractor 262 to generate a color scheme for the automatically-generated content item. Color scheme selector 264 may select a color for a background color, button color, headline color, description color, button text color, or other portions of the generated content item. Color scheme selector 264 may determine the saturation, brightness, noticeability, and/or other attributes of each extracted color as well as the contrast between each of the extracted colors.

In some implementations, color scheme selector 264 may select the most dominant color (e.g., heaviest weighted, highest dominance ranking, etc.) extracted by color extractor 262 as the background color for the content item. Color scheme selector 264 may select the extracted color with the highest multiplied saturation and weight (e.g., max (saturation*weight)) as the button color for the content item. Color scheme selector 264 may select the colors with the highest contrast and/or brightness differences with the selected background color as the colors for the headline and description text. If more than two colors are available, color scheme selector 264 may select the more noticeable color as the headline color.

In other implementations, color scheme selector 264 may select a predefined color scheme for the content item. The predefined color scheme may be used to select the background color, button color, headline color, description color, button text color, or other portions of the generated content item rather than directly applying the colors extracted by color extractor 262. The predefined color scheme may be a combination of colors previously assembled into a color template or color group. In some implementations, the predefined color scheme may be selected from a set of predefined color schemes based on the colors extracted by color extractor 262. For example, color scheme selector 264 may compare the colors extracted by color extractor 262 with the colors included in a plurality of predefined color schemes. Color scheme selector 264 may rank the predefined color schemes based on the differences (e.g., RGB values, saturation, brightness, contrast, etc.) between one or more of the colors extracted by color extractor 262 and one or more of the colors included in the predefined color scheme. Colors from a predefined color scheme may supplement or replace colors identified by color extractor 262 in the automatically-generated content item.

Figure 5:
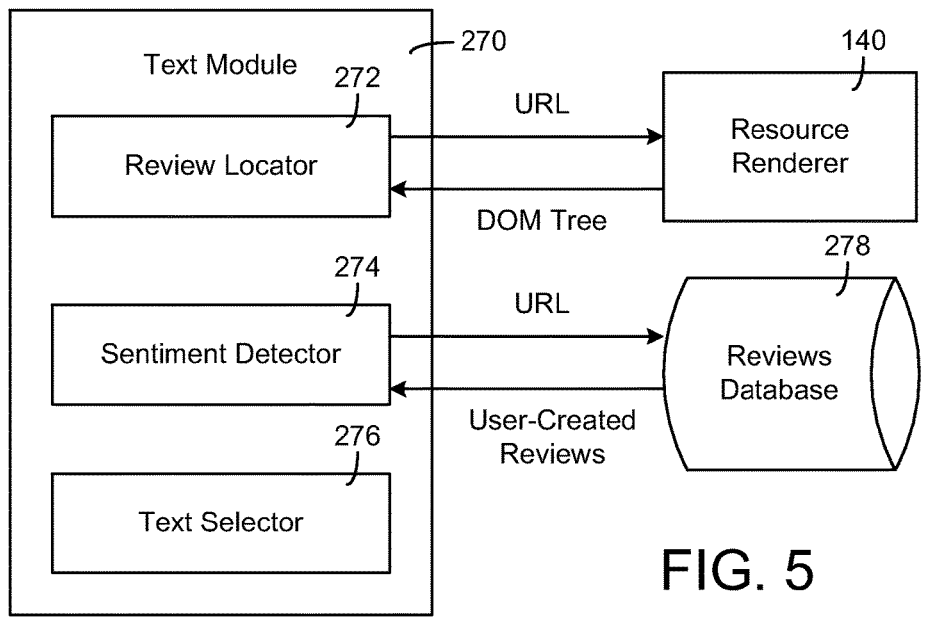
FIG. 5 is a detailed block diagram of the text module shown in FIG. 2 including a review locator, a sentiment detector, and a text selector, according to a described implementation.

Referring now to FIG. 5, a block diagram of text module 270 is shown, according to a described implementation. In some implementations, text module 270 may be used to automatically create a textual portion of the display content generated by content generation system 200 (e.g., textual description, headline, etc.). In other implementations, text module 270 may be used to independently generate purely textual content items. Advantageously, text module 270 may automatically generate a "creative" portion of a content item (e.g., a text-based description, persuasive text, positive sentiment, etc.), thereby eliminating the need for a content provider to spend time writing the creative or employ a copywriter to develop the creative. Text module 270 is shown to include a review locator 272, a sentiment detector 274, and a text selector 276.

In some implementations, text module 270 uses the DOM tree or snapshot image of landing resource 130 to create a summary of the text displayed on landing resource 130. For example, text module 270 may receive the rendered DOM tree from resource renderer 140 and extract textual the textual information displayed on landing resource 130. In other implementations, text module 270 obtains textual data from sources other than landing resource 130. For example, text module 270 may receive textual data from user-created reviews of a business, product, or service.

Still referring to FIG. 5, text module 270 is shown to include a review locator 272. Review locator 272 may search a reviews database 278 for user-created reviews. In some implementations, the reviews may apply to a business as a whole. In other implementations, the reviews may apply to a particular product or service associated with landing resource 130 (e.g., featured, displayed, presented, etc. on landing resource 130). Reviews database 278 may be an Internet resource (e.g., website) on which users are permitted to post comments, submit reviews, evaluate products and/or services, or otherwise communicate their opinions regarding a particular business. For example, reviews database 278 may be a website such as Google+ Local, ZAGAT, YELP, URBANSPOON, or other resource through which user-created reviews are obtained.

In some implementations, review locator 272 may use the URL of landing resource 130 to locate such reviews and/or direct text module 270 to a particular resource or portion of a resource dedicated to reviews of a particular business. For example, the URL of landing resource 130 may be used to specify a portion of reviews database 278 on which reviews pertaining to the business entity associated with landing resource 130 may be obtained. In some implementations, review locator 272 may search multiple resources for user-created reviews pertaining to the business identified by landing resource 130. In some implementations, review locator 272 may transcribe audio-based or video-based reviews to generate textual reviews for further analysis.

Still referring to FIG. 5, text module 270 is further shown to include a sentiment detector 274. Sentiment detector 274 may be configured to determine whether a review is positive or negative with or without a numerically expressed rating (e.g., "1 out of 5," "4 stars," etc.). Sentiment detector 274 may parse the language of the review, looking for adjectives indicative of a generally positive sentiment (e.g., excellent, good, great, fantastic, etc.). Sentiment detector 274 may analyze a portion of a review, the entire text of a review, or the text of a review in conjunction with a numerically expressed rating to identify reviews expressing a generally positive sentiment Text selector 276 may search the reviews for a "snippet" (e.g., phrase, text string, portion, etc.) which, when read in isolation, effectively communicates why the user who submitted the review had a positive experience with the reviewed business, product, or service. The "snippet" may include one or more of the positive adjectives used by sentiment detector 274 in identifying a sentiment associated with the review. For example, text selector 276 may select the snippet "excellent pasta and speedy service" from a relatively lengthy review of an Italian restaurant. In some implementations, the text snippets identified by text selector 276 may be presented to a content requestor 120 as potential "creatives" (e.g., descriptive text) for use in purely-textual content items. In other implementations, the text snippets may be used as a textual portion of one or more display content items generated by content generation system 200.

Figure 6:
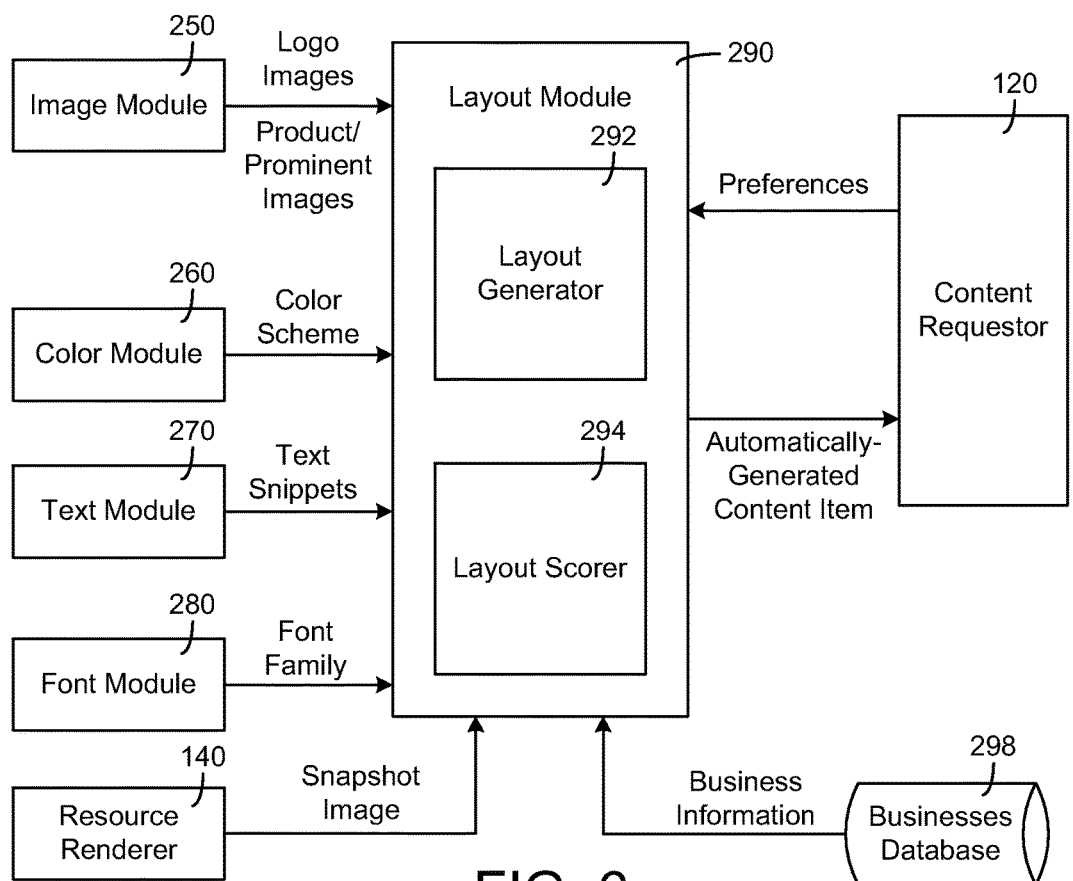
FIG. 6 is a detailed block diagram of the layout module shown in FIG. 2 including a layout generator and a layout scorer, according to a described implementation.

Referring now to FIG. 6, a block diagram of layout module 290 is shown, according to a described implementation. Layout module 290 may generate a layout for the automatically-generated content item. Layout module 290 may receive a list of logo images and a list of product/prominent images from image module 250. Each list of images may identify several images and rank each image (e.g., with a salience score, relevance score, etc.) Layout module 290 may further receive one or more selected color schemes from color module 260 and one or more selected font families from font module 280. The selected color schemes and selected font families may be received with scores assigned to each. Layout module 290 may further receive a selection of text snippets from text module 270. The selected text snippets may have any length and may include any number of snippets.

In some implementations, layout module 290 may receive a snapshot image of landing resource 130 from resource renderer 140. Layout module 290 may use the snapshot image to determine a style (e.g., modern, rustic, etc.), and/or visual appearance (e.g., usage of shapes, square corners, rounded corners, etc.) of landing resource 130. Layout module 290 may invoke a businesses database 298 to obtain business information for landing resource 130. The business information may specify a category of business associated with landing resource 130 (e.g., fast food, automotive parts, etc.) as well as other attributes of the associated business.

Still referring to FIG. 6, layout module 290 is shown to include a layout generator 292. Layout generator 292 may generate a layout for the content item based on the identified images, text snippets, color scheme, and font family. For example, layout generator 292 may use the display sizes (e.g., height, width, etc.) of the images identified by image module 250 as well as the lengths of the text snippets identified by text module 270 to create a layout for the content item.

In some implementations, layout generator 292 selects a layout from a set of predefined layout options (e.g., template layouts). Template layouts may include a predefined position and display size for text, images, action buttons and/or other features of the content item. Layout generator 292 may resize the image(s) and/or adjust the text to fit a selected layout. In other implementations, layout generator 292 creates a new layout for the content item. Advantageously, the new layout may not based on a template or predefined design, thereby resulting in a unique-looking content item. Non-template layout designs are described in greater detail in reference to FIGS. 7-12.

Still referring to FIG. 6, layout module 290 is further shown to include a layout scorer 294. Layout scorer 294 may assign a numeric score to various layouts generated by layout generator 292. The overall score for a content item may be based on the individual scores (e.g., image salience, color cluster weights, etc.) of the selected images, text snippets, colors, and fonts used in the content item. In some implementations, the assigned score may be based on how efficiently space is used in the content item (e.g., a ratio of empty space to utilized space), how well the selected images and selected text fit the generated layout (e.g., the degree of cropping or stretching applied to images), how well the colors in the selected images match the other colors displayed in the content item, readability of text (e.g., contrast between text color and background color, usage of sans-serif fonts, etc.), and/or other aesthetic criteria (e.g., usage of the "golden ratio," padding around the outer perimeter of the content item, spacing between images, text, and other components of the content item, etc.). Scoring criteria may further include the relative locations of images, text, and action button in the content item. For example, a higher score may be assigned to content items having an image, text, and action button arranged in descending order from the top right corner of the content item to the bottom left corner of the content item.

Referring now to FIGS. 7-12 several non-template layout designs are shown, according to a described implementation. The non-template layout designs may be based on a set of flexible layout generation criteria. Advantageously, the flexible layout generation criteria may result in layouts which adapt to the attributes of the images, text snippets, fonts, and colors selected by modules 250-280 of content generation system 200. This adaptive layout criteria may result in unique-looking content items (e.g., not based on templates) which are tailored to a particular landing resource.

Figure 7:
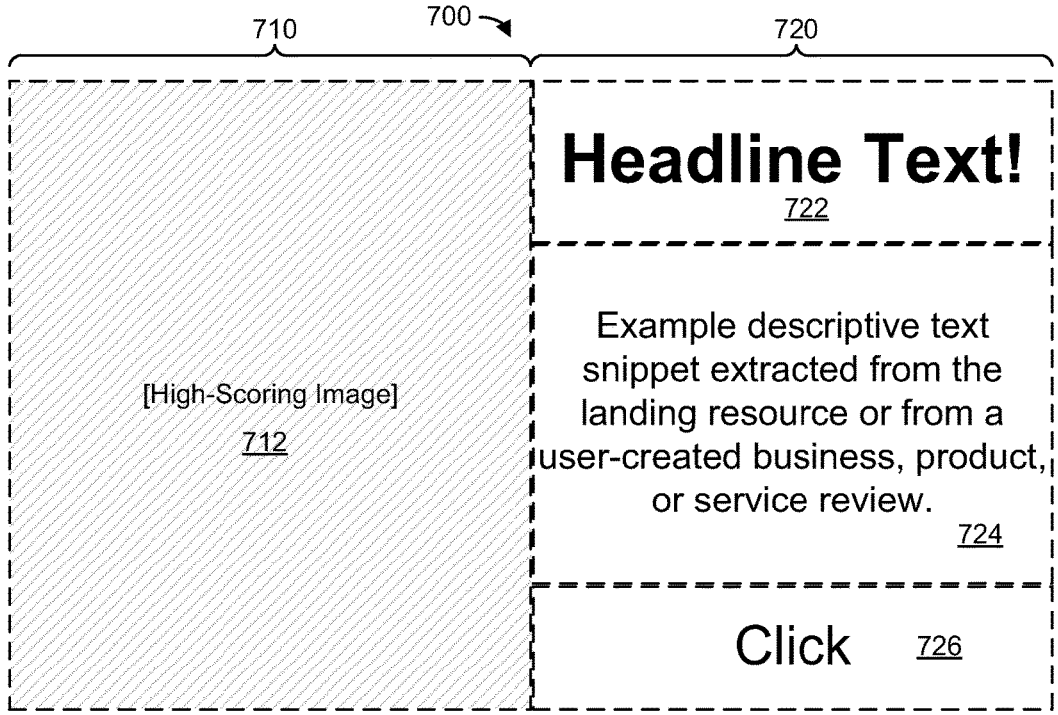
FIG. 7 is a drawing of a "half-and-half" layout generated by the layout generator shown in FIG. 6, according to a described implementation.

For example, referring specifically to FIG. 7, layout generator 292 may create a "half and half" layout 700 when a particularly high scoring image (e.g., an image with a salience score or relevance score exceeding a threshold value) is provided by image module 250. Layout 700 is shown to include a first half 710 and a second half 720. Half 710 may be dedicated to displaying the high-scoring image 712 whereas half 720 may be used to display a headline text (e.g., text box 722), descriptive text (e.g., text box 724), and/or an action button 726. Headline text 722 and descriptive text 724 may be extracted from landing resource 130 or from a user-created business, product, or service review. Action button 726 may include "call-to-action" text (e.g., "click here," "buy now," "read more," etc.) enticing a user to click the generated content item.

In some implementations, the relative sizes of text boxes 722,724 and action button 726 may be adjusted based on the length of the text snippet selected by text module 270 and/or the font selected by font module 280. An image displayed on half 710 may be resized (e.g., cropped, stretched, compressed, etc.) to fit the dimensions of half 710. In some implementations, half 710 may be positioned to the left of half 720. In other implementations, half 710 may be positioned to the right of half 720 (e.g., for landscape content items) or above/below half 720 (e.g., for portrait content items).

Figure 8:
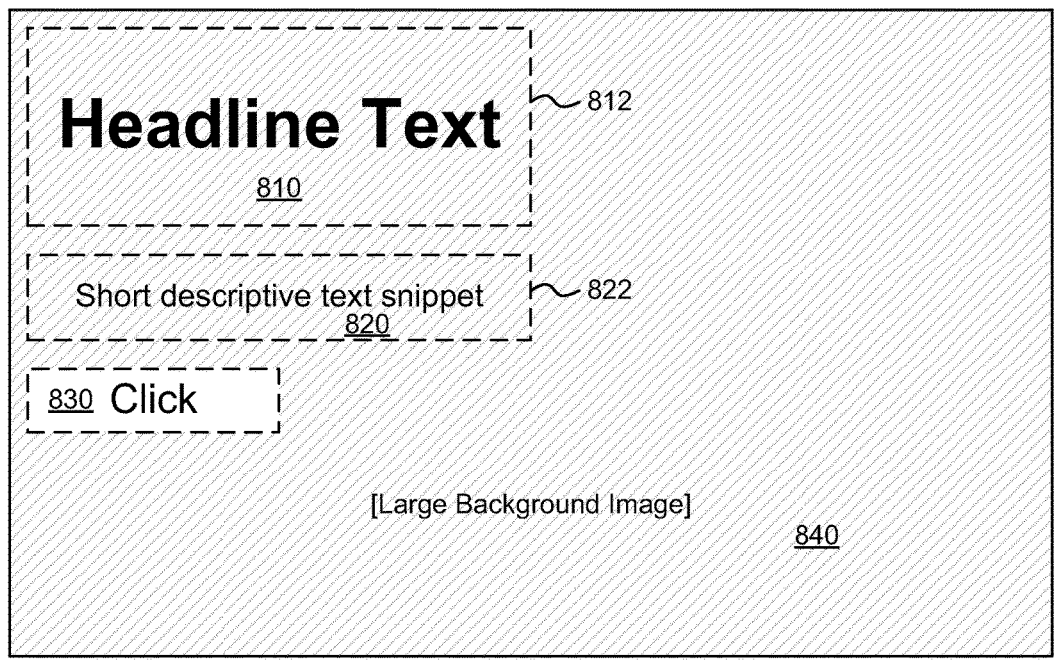
FIG. 8 is a drawing of a "text overlay" layout generated by the layout generator shown in FIG. 6, according to a described implementation.

Referring now to FIG. 8, layout generator 292 may create a "text overlay" layout 800 when an image with a large display size is provided by image module 250. Layout 800 is shown to include headline text 810, descriptive text 820, action button 830, and a background image 840. Headline text 810 and descriptive text 820 may be contained within transparent or translucent text boxes 812 and 822 such that background image 840 is visible behind the presented text. In some implementations, text boxes 812,822 may be translucently shaded to provide contrast between the colors of text 810,820, and background image 840. The translucent shading may improve readability of the presented text 810,820 when overlaid onto background image 840. For layouts in which the color of headline text 810 or descriptive text 820 is dark (e.g., black, brown, dark blue, etc.), text boxes 812 and/or 822 may be shaded white or another light color. Action button 830 may be opaque, transparent, or translucently shaded. Layout 800 may allow a large background image 840 to be displayed without substantially resizing or cropping background image 840. The display sizes and display positions of headline text 810, descriptive text 820, and action button 830 may be adjusted based on the length of the text snippets selected by text module 270 and the font family selected by font module 280.

Figure 9:
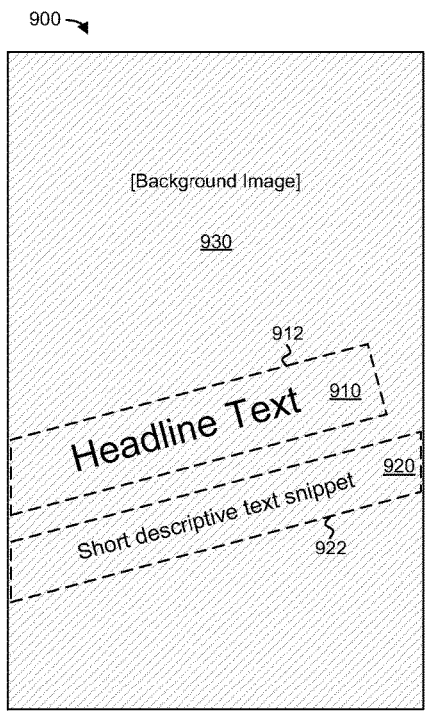
FIG. 9 is a drawing of a "slanted text" layout generated by the layout generator shown in FIG. 6, according to a described implementation.

Referring now to FIG. 9, layout generator 292 may create a "slanted text" layout 900 when a high-scoring image is provided by image module 250 and the text snippets selected by text module 270 are relatively short. Layout 900 is shown to include headline text 910, descriptive text 920, and a background image 930. Background image 930 may fill the entire space of the content item, thereby providing a relatively large depiction of a product, service, or business featured in the content item. Headline text 910 and descriptive text 920 may be overlaid onto background image 930. Texts 910,920 may be slanted relative to the edges of the content item. Headline text 910 and descriptive text 920 may be contained within transparent or translucent text boxes 912 and 922 to provide contrast between the colors of text 910,920, and background image 940. The translucent shading may improve readability of the presented text 910,920 when overlaid onto background image 940.

Figure 10:
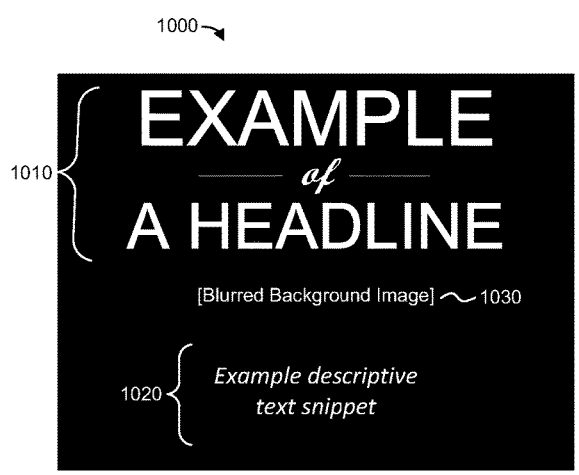
FIG. 10 is a drawing of a "blurred image" layout generated by the layout generator shown in FIG. 6, according to a described implementation.

Referring now to FIG. 10, layout generator 292 may create a "blurred background" layout 1000. Layout 1000 is shown to include headline text 1010, descriptive text 1020, and a blurred background image 1030. Headline text 1010 is shown to include the words "example of a headline." In some implementations, layout generator 292 may search the text snippets provided by text module 270 for transition words. Transition words may be short words such as "in," "on," "for," "of," "and," etc. linking two parts of a text snippet. Layout generator 292 may stylize (e.g., italicize, bold, enhance, etc.) the transition word and/or place the transition word on a separate line in the content item. Background image 1030 may be blurred, faded, or otherwise obscured. Advantageously, blurring background image 1030 may focus a reader's attention on the textual portion of the content item. The fonts for headline text 1010 and descriptive text 1020 may be specified by font module 280 based on the fonts extracted from landing resource 130.

Figure 11A:
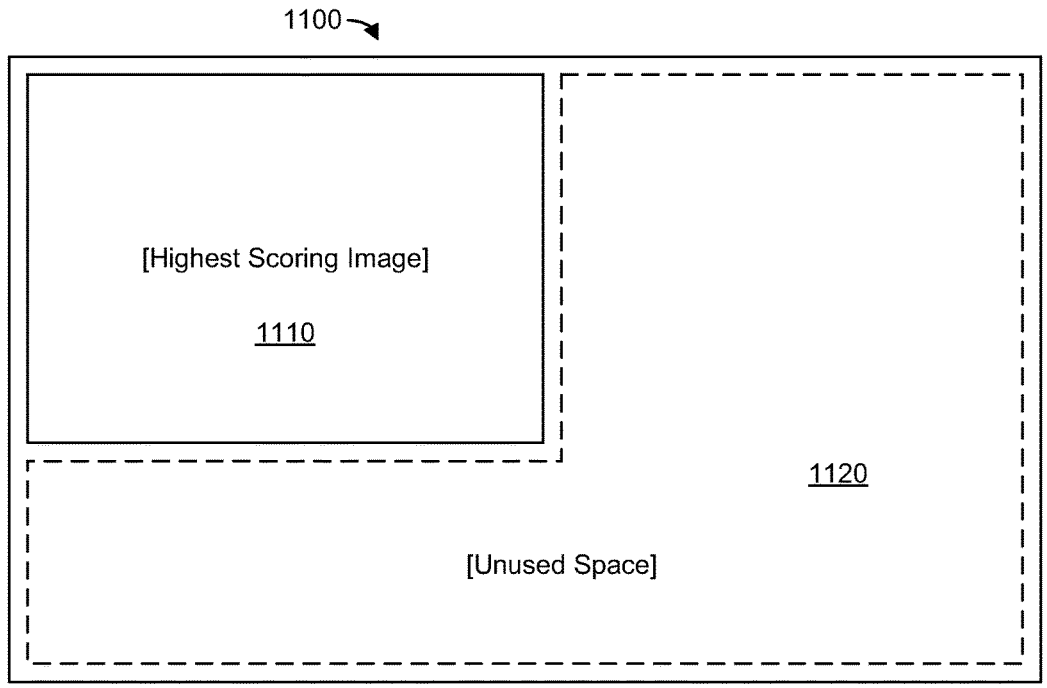
FIG. 11A is a drawing of a flexible layout generated by the layout generator shown in FIG. 6 including a high scoring image and unused space, according to a described implementation.
Figure 11B:
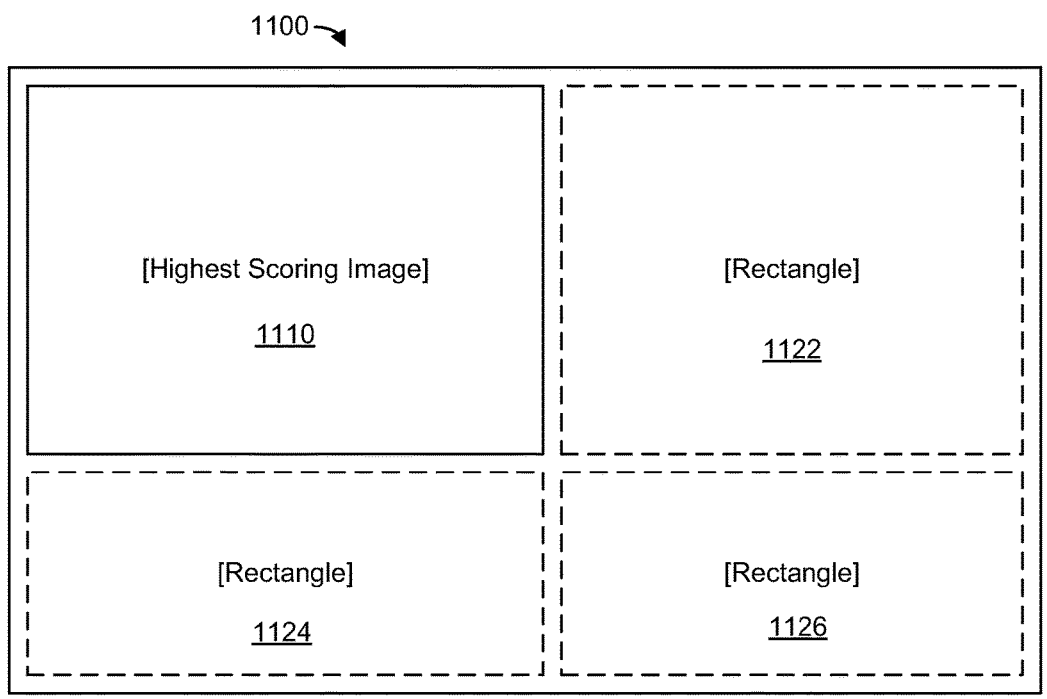
FIG. 11B is a drawing of the flexible layout shown in FIG. 11A with the unused space divided into several rectangles, according to a described implementation.
Figure 11C:
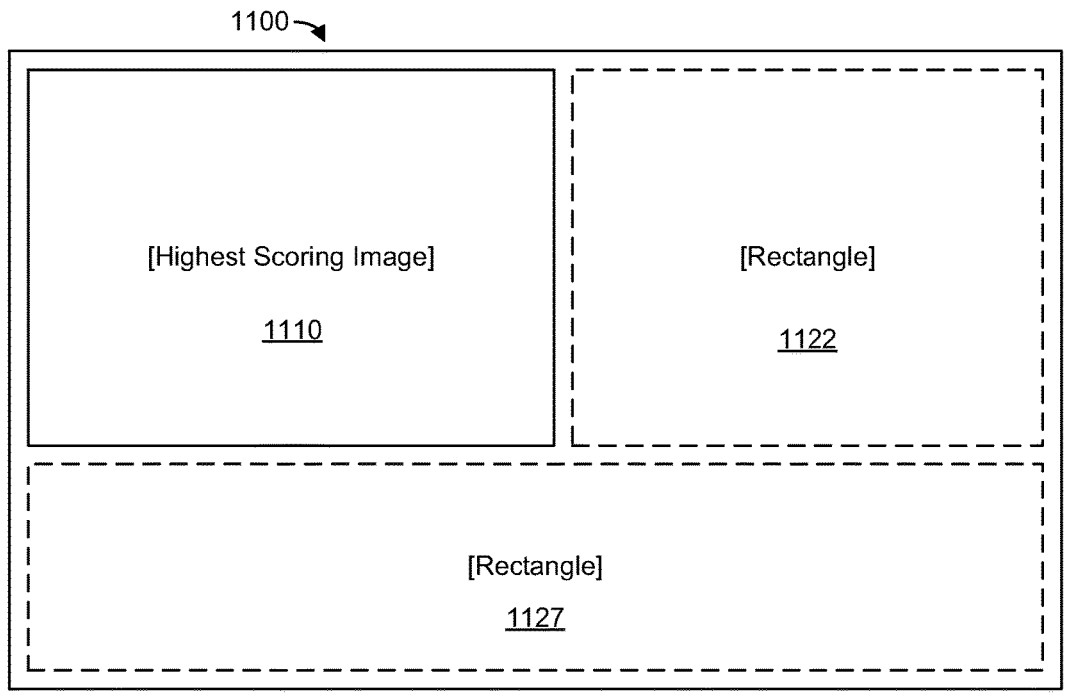
FIG. 11C is a drawing of the flexible layout shown in FIG. 11B after combining some of the rectangles into a larger "landscape-style" rectangle, according to a described implementation.
Figure 11D:
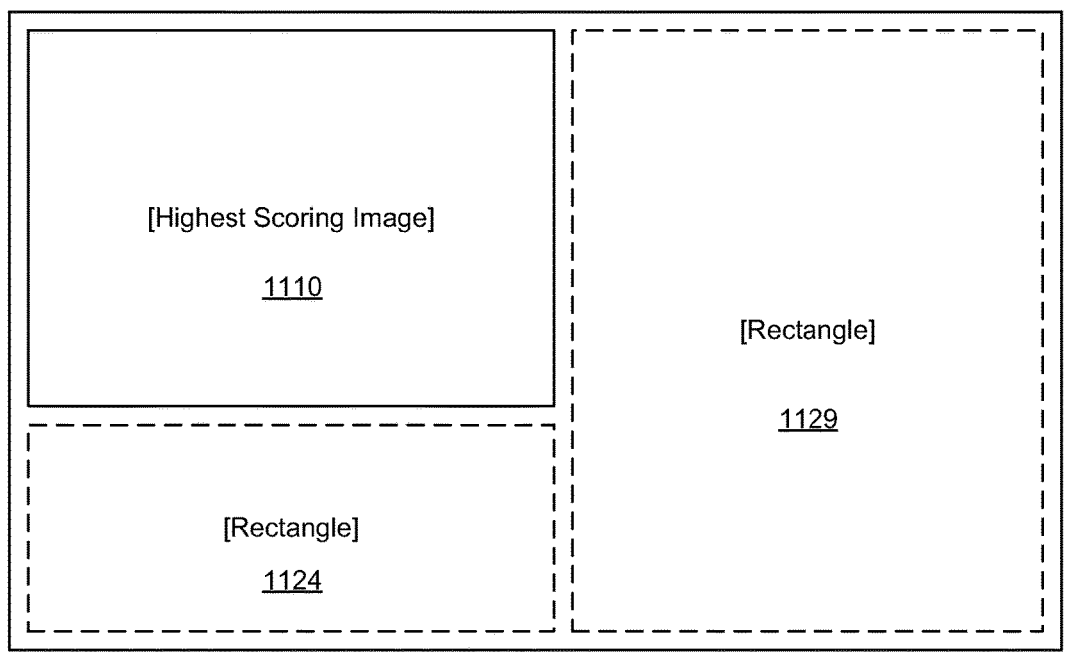
FIG. 11D is a drawing of the flexible layout shown in FIG. 11B after combining some of the rectangles into a larger "portrait-style" rectangle, according to a described implementation.

Referring now to FIGS. 11A-11D, layout generator 292 may create a flexible layout 1100 when the display sizes of the selected images and text snippets do not fill the entire content item. For example, layout generator 292 may place the highest scoring logo or product/prominent image 1110 in a corner (e.g., top left, top right, bottom left, bottom right) of the content item. Layout generator 292 may divide the remaining unused space 1120 into one or more rectangles (e.g., rectangles 1122, 1124, 1126 as shown in FIG. 11B). In some implementations, layout generator 292 may combine one or more of the rectangles into a larger rectangle. Referring specifically to FIG. 11C, rectangles 1124 and 1126 are shown combined into a larger rectangle 1127. Referring specifically to FIG. 11D, rectangles 1122 and 1126 are shown combined into a larger rectangle 1129.

Layout generator 292 may combine one or more rectangles based on the display sizes or aspect ratios of the remaining unused text snippets selected by text module 270 and/or images selected by image module 250. For example, if an unused image has a display height attribute (e.g., 400 pixels, 200 pixels, etc.) which exceeds the unused image's display width attribute (e.g., 200 pixels, 10 pixels, etc.) layout generator 292 may combine rectangles 1122 and 1126 to create a "portrait-style" rectangle 1129 (e.g., a rectangle having a display height which exceeds the rectangle's display width). Advantageously, the unused space may be allocated as necessary to accommodate the aspect ratios, display sizes, and display lengths of the remaining unused images and/or text snippets.

Figure 12B:
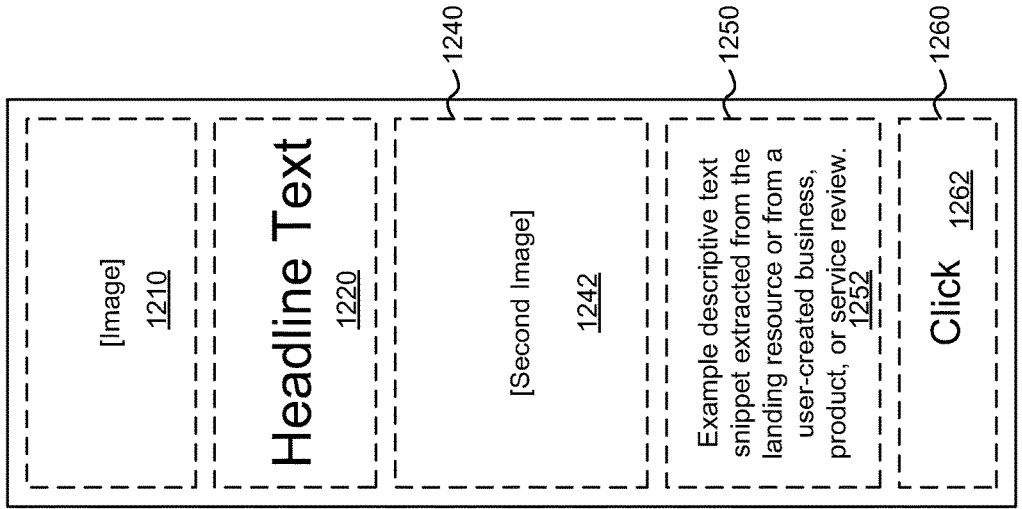
FIG. 12B is a drawing of the flexible layout as applied to the "banner-style" content item shown in FIG. 12A with the unused space divided into several rectangles, according to a described implementation.
Figure 12A:
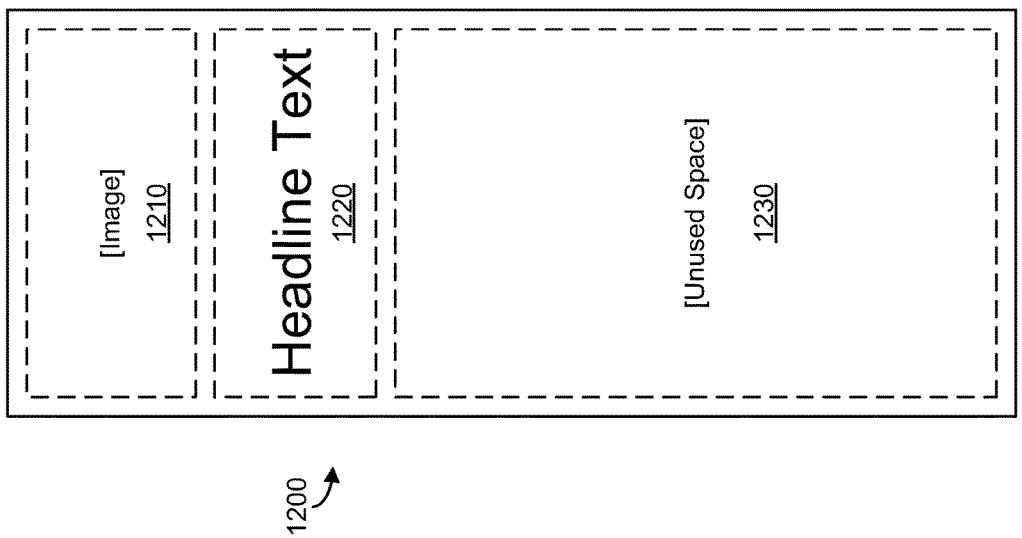
FIG. 12A is a drawing of a flexible layout generated by the layout generator shown in FIG. 6 as applied to a "banner-style" content item including an image, headline text, and unused space, according to a described implementation.

Referring now to FIGS. 12A and 12B, a flexible layout 1200 for banner-style content items is shown, according to a described implementation. Referring specifically to FIG. 12A, flexible layout 1200 is shown to include an image 1210, headline text 1220, and unused space 1230. Layout generator 292 may create layout 1200 by initially placing a high-scoring image 1210 and headline text 1220 within the content item. Image 1210 may be placed along the top, bottom, side, middle, or corner of the content item. Headline text 1220 may be placed in a suitable location within the content item such that the headline text 1220 does not overlap image 1210. Headline text 1220 may be placed below image 1210, above image 1210, beside image 1210, or elsewhere within the content item. Advantageously, the locations of image 1210 and headline text 1220 are flexible because layout 1200 is not based on a preconfigured template design. After placing image 1210 and text 1220, layout generator 292 may determine an amount of unused space 1230 remaining within the content item.

Referring specifically to FIG. 12B, layout generator 292 may divide unused space 1230 into one or more rectangles (e.g., rectangles 1240, 1250, and 1260). In some implementations, the display sizes or aspect ratios of the rectangles may be based on the display sizes and/or aspect ratios of remaining unused text snippets selected by text module 270 or unused images selected by image module 250. Layout 1200 is shown to include a second image 1242 placed in a first rectangle 1240, a descriptive text snippet 1252 placed in a second rectangle 1250, and an action button 1262 placed in a third rectangle 1260.

Figure 13:
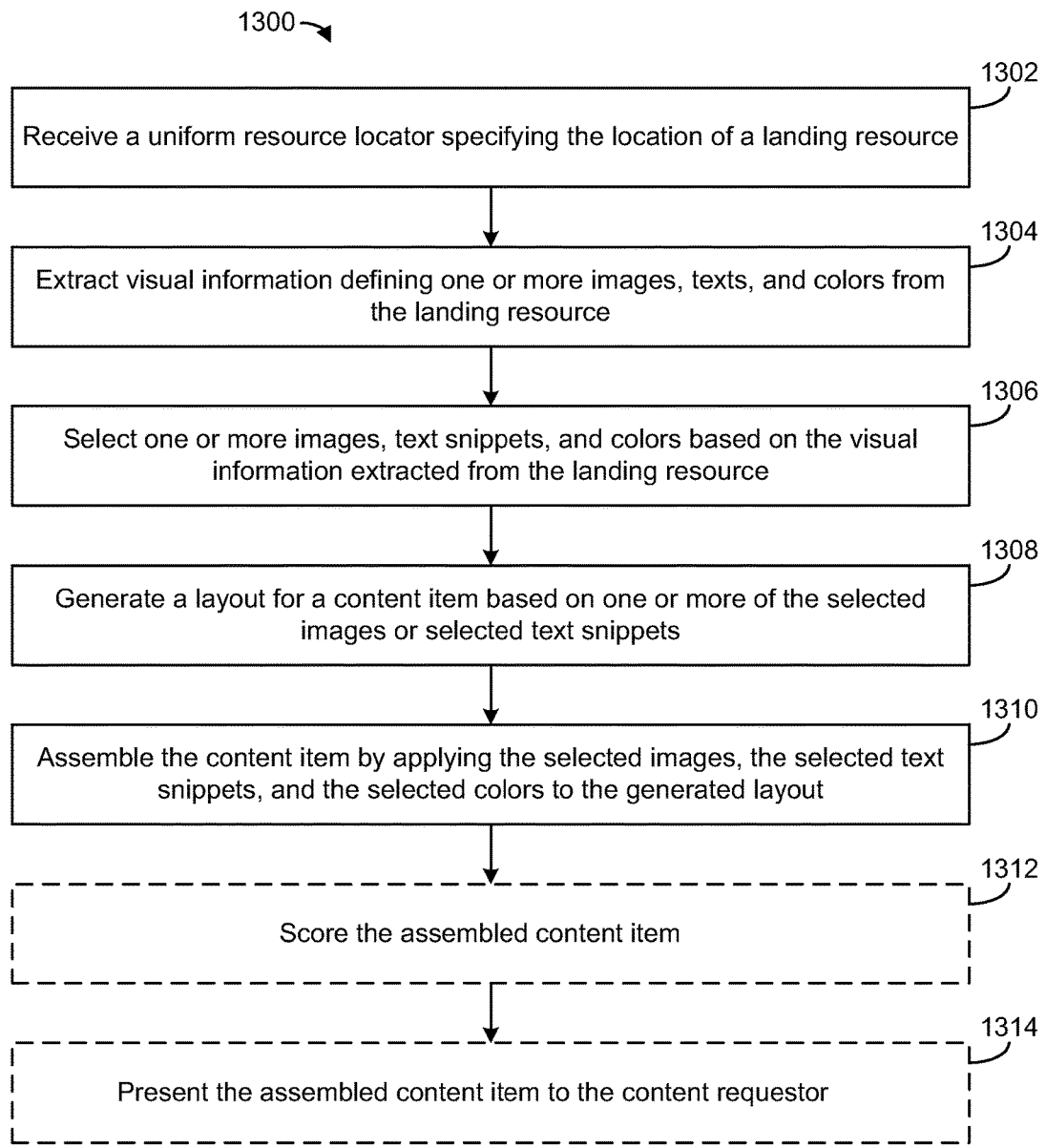
FIG. 13 is a flowchart of a process for automatically generating display content, according to a described implementation.

Referring now to FIG. 13, a flowchart of a process 1300 for automatically generating display content is shown, according to a described implementation. Process 1300 is shown to include receiving a uniform resource locator (URL) specifying the location of a landing resource (step 1302). The URL may be received from a content requestor as part of a request to generate content items. The URL may specify the location of a landing resource to which a user device is directed when the generated content item is "clicked." The landing resource may be displayed on a user interface device (e.g., a monitor, touch screen, or other electronic display) in response to a user clicking (e.g., with a mouse) or otherwise activating the generated content item. The landing resource may be a webpage, a local resource, an intranet resource, an Internet resource, or other network resource. In some implementations, the landing resource may provide additional information relating to a product, service, or business featured in the automatically generated content item. For example, the landing resource may be a website through which a product or service featured in the generated content item may be purchased.

Still referring to FIG. 13, process 1300 is further shown to include extracting visual information defining one or more images, texts, and colors from the landing resource (step 1304). In some implementations, the visual information includes the images, colors, and text actually displayed on the landing resource when the landing resource is rendered. Step 1304 may involve rendering the landing resource using a resource renderer (e.g., a web browser or other rendering-capable hardware or software component) and generating a DOM tree or snapshot image of the rendered landing resource. In other implementations, the visual information includes metadata and other code (e.g., HTML code, CSS code, etc.) not directly visible from a snapshot image of the landing resource. The hidden code and metadata may define the locations (e.g., URLs), display sizes, display locations (e.g., top of the landing resource, middle of the landing resource, etc.), and other relevant attributes of images (e.g., alt text, special logo markup tags, etc.) displayed on the landing resource. The hidden code and metadata may also define font names, font families, colors, and text displayed on the landing resource. The visual information may be define a particular business, product, or service displayed on the landing resource.

Still referring to FIG. 13, process 1300 is further shown to include selecting one or more images, text snippets, and colors based on the visual information extracted from the landing resource (step 1306). In some implementations, step 1306 includes selecting one or more images, text snippets and colors actually displayed on the landing resource. Selecting a displayed image may include scoring or ranking the images extracted from the landing resource and selecting an image based on the assigned scores. Scores may be assigned to an image based on the metadata (e.g., a URL, a display position, a display size, alt text, etc.) associated with the image. In some implementations, scores may be assigned to an image based on whether the metadata associated with the image contains a specified keyword which selects for logo images. For example, the keyword may be a special logo markup tag such as link rel="example-logo-markup".

In some implementations, selecting a displayed color may include extracting one or more colors from a snapshot image of the landing resource. Each pixel of the snapshot image may be treated as an independent color measurement and dominant colors may be extracted using a clustering technique such as k-means clustering. For example, several initial color clusters may be established and labeled with an initial color value (e.g., RGB color values, hexadecimal color codes, etc.) Each pixel in the snapshot image may be assigned to the color cluster having a color value closest to the color value of the pixel. After assigning each pixel to the closest cluster, the mean color value of each cluster may be re-computed based on the color values of the pixels in the cluster. In some implementations, successive iterations may be performed by reassigning pixels to the cluster having the closest mean color value until the clusters converge on steady mean values or until a threshold number of iterations has been performed. Step 1306 may involve assigning a weight to each color based on the number of pixels in the corresponding color cluster relative to the total number of pixels in the snapshot image. The color(s) with the greatest weight may be selected for inclusion in the automatically-generated content item.

In some implementations, selecting a text displayed on the landing resource may involve parsing the HTML DOM tree for text and generating a summary of the text displayed on the landing resource. In other implementations, the snapshot image may be analyzed and text may be extracted from the rendered image using optical character recognition (OCR) or other text recognition techniques. The summary text may be a continuous text string displayed on the landing resource or a summary assembled from text fragments displayed in various locations on the landing resource.

In some implementations, step 1306 includes selecting one or more images, text snippets and/or colors not actually displayed on the landing resource. For example the visual information extracted from the landing resource may identify a particular business, product, or service. An image (e.g., a business logo, trademark, service mark, etc.) may be selected from a set of previously stored logo images based on the identity of the business, product, or service displayed regardless of whether the logo image is actually displayed on the landing resource. A color scheme may be selected from a set of previously-assembled (e.g., automatically, manually, etc.) color schemes based on the colors extracted from the landing resource. In some implementations, a color scheme may be selected regardless of whether any of the colors included in the color scheme are actually displayed on the landing resource. In some implementations, a text snippet may be selected from hidden metadata, HTML code, or other text not actually displayed on the landing resource. For example the visual information extracted from the landing resource may identify a particular business, product, or service. This identity may be used to locate a corpus of user-created reviews relating to the particular business, product, or service and a text snippet may be selected from one or more of the user-created reviews.

Still referring to FIG. 13, process 1300 is further shown to include generating a layout for a content item based on one or more of the selected images or selected text snippets (step 1308). Step 1308 may involve placing a high scoring logo or product/prominent image in a corner (e.g., top left, top right, bottom left, bottom right), edge (e.g., top, bottom, left, right,), or middle (e.g., not an edge or corner) of a content item and dividing the remaining unused space into one or more rectangles. The amount of space remaining may be based on the display size of the image placed in the content item. In some implementations, one or more of the rectangles may be combined into a larger rectangle based on the display sizes or aspect ratios of the remaining text snippets and images. For example, if an unused image has a display height attribute (e.g., pixels, inches, etc.) which exceeds the unused image's display width attribute (i.e., a "portrait-style" image), rectangles may be combined to create a "portrait-style" space into which the image may be placed. Advantageously, the unused space may be allocated as necessary to accommodate the aspect ratios or display sizes of the remaining unused images as well as the lengths of any unused text snippets.

In some implementations, step 1308 may involve receiving a snapshot image of the landing resource and using the snapshot image to determine a style (e.g., modern, rustic, etc.), and/or visual appearance (e.g., usage of shapes, square corners, rounded corners, etc.) of the landing resource. Step 1308 may involve invoking a businesses database to obtain business information for the landing resource. The business information may specify a category of business associated with the landing resource (e.g., fast food, automotive parts, etc.) as well as other attributes of the associated business. The layout generated by step 1308 may be based on the style information and/or the business information.

Still referring to FIG. 13, process 1300 is further shown to include assembling the content item by applying the selected images, the selected text snippets, and the selected colors to the generated layout (step 1310). In some implementations, the selected images and text snippets may be cropped or resized to fit within designated placeholders in the generated layout. In other implementations, the placeholders may be resized, moved, or re-arranged to accommodate the selected images and/or text. The selected colors may be applied to the content item as background colors, text colors, button colors, translucent text box shading colors, border colors, or any other color visible in the generated content item.

In some implementations, process 1300 may further include scoring the assembled content item (step 1312) and presenting the assembled content item to the content requestor (step 1314). The overall score for a content item may be based on the individual scores (e.g., image salience, color cluster weights, etc.) of the selected images, text snippets, colors, and fonts used in the content item. In some implementations, the assigned score may be based on how efficiently space is used in the content item (e.g., a ratio of empty space to utilized space), how well the selected images and selected text fit the generated layout (e.g., the degree of cropping or stretching applied to images), how well the colors in the selected images match the other colors displayed in the content item, readability of text (e.g., contrast between text color and background color, usage of sans-serif fonts, etc.), and/or other aesthetic criteria (e.g., usage of the golden ratio, padding around the outer perimeter of the content item, spacing between images, text, and other components of the content item, etc.). Scoring criteria may further include the relative locations of images, text, and action button in the content item. For example, a higher score may be assigned to content items having an image, text, and action button arranged in descending order from the top right corner of the content item to the bottom left corner of the content item.

The completed content item may be presented to the content requestor along with other automatically-generated content items. The content requestor may approve or reject the automatically-generated content item. If approved, the content item may be used in conjunction with the content requestor's established content display preferences and delivered to a user interface device via content slots on one or more electronically-presented resources. In some implementations, the images, text snippets, colors, and/or layout of an approved content item may be recorded. The recorded data may be used to generate subsequent content items for the same content requestor or a different content requestor. For example, an approved logo image (e.g., a business logo, product logo, etc.) may be used in subsequent content items generated for the same content requestor. An approved layout may be used as a flexible template when generating content items for other content requestors. Advantageously, the input received from content requestors (e.g., approving or rejecting content items) may complete a feedback loop for adaptively designing, configuring, or generating content items.

Figure 14:
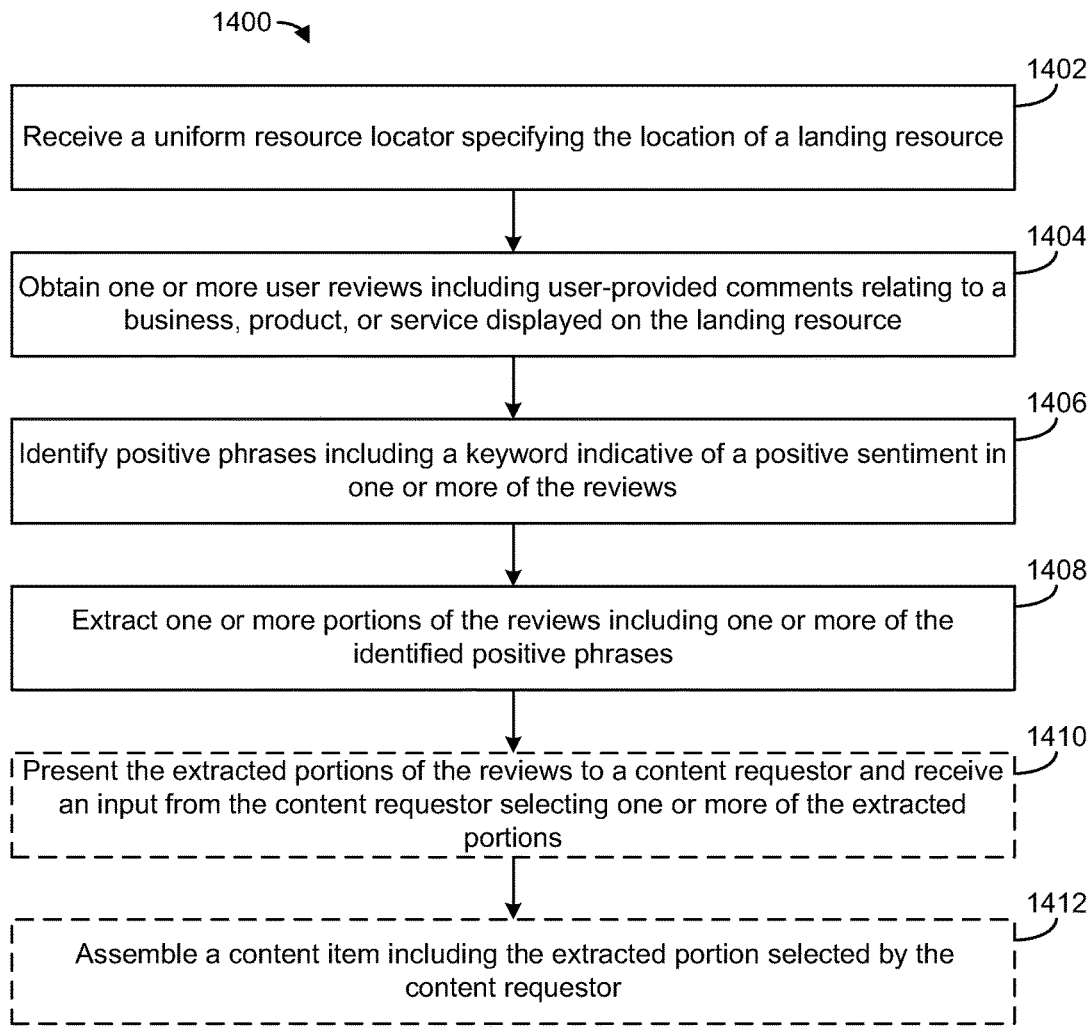
FIG. 14 is a flowchart of a process for automatically generating a textual portion of a display content item or a purely textual content item, according to a described implementation.

Referring now to FIG. 14, a flowchart of a process 1400 for automatically generating a textual portion of a content item is shown, according to a described implementation. In some implementations, process 1400 may be used to automatically create a textual portion (e.g., textual description, headline, etc.) of a content item which also includes images, colors, or other non-textual elements. In other implementations, process 1400 may be used to independently create purely textual content items. Advantageously, process 1400 may automatically generate a "creative" portion of a content item (e.g., a text-based description, persuasive text, positive sentiment, etc.), thereby eliminating the need for a content provider to spend time writing the creative or employ a copywriter to develop the creative.

Process 1400 is shown to include receiving a uniform resource locator specifying the location of a landing resource (step 1402). The URL may be received from a content requestor as part of a request to generate content items. The URL may specify the location of a landing resource to which a user device is directed when the generated content item is "clicked." The landing resource may be displayed on a user interface device (e.g., a monitor, touch screen, or other electronic display) in response to a user clicking (e.g., with a mouse) or otherwise activating the generated content item. The landing resource may be a webpage, a local resource, an intranet resource, an Internet resource, or other network resource. In some implementations, the landing resource may provide additional information relating to a product, service, or business featured in the automatically generated content item. For example, the landing resource may be a website through which a product or service featured in the generated content item may be purchased Still referring to FIG. 14, process 1400 is shown to further include obtaining one or more user reviews including user-provided comments relating to a business, product, or service displayed on the landing resource (step 1404). In some implementations, the reviews may apply to a business as a whole. In other implementations, the reviews may apply to a particular product or service associated with the landing resource (e.g., featured, displayed, presented, etc. on the landing resource). The user-provided reviews may be obtained from a reviews database. The reviews database may be an Internet resource (e.g., website) on which users are permitted to post comments, submit reviews, evaluate products, services, or otherwise communicate their opinions regarding a particular business. For example, the reviews database may be a website such as Google+ Local, ZAGAT, YELP, URBANSPOON, or other resource through which user-created reviews may be obtained.

In some implementations, step 1404 may involve using the URL of the landing resource to locate such reviews or to identify a particular resource or portion of a resource dedicated to reviews of a particular business. For example, the URL of the landing resource may be used to specify a portion of the reviews database on which reviews pertaining to the business entity associated with the landing resource may be obtained. Step 1404 may involve searching multiple resources for user-created reviews pertaining to the business identified by the landing resource. In some implementations, step 1404 may involve transcribing audio-based or video-based reviews to generate textual reviews for further analysis.

Still referring to FIG. 14, process 1400 is further shown to include identifying positive phrases including a keyword indicative of a positive sentiment in one or more of the reviews (step 1406). Step 1406 may be performed to determine whether a review is positive or negative with or without a numerically expressed rating (e.g., "1 out of 5," "4 stars," etc.). Step 1406 may involve parsing the language of the review, looking for adjectives indicative of a positive sentiment (e.g., excellent, good, great, fantastic, etc.). Step 1406 may involve analyzing a portion of a review, the entire text of a review, or the text of a review in conjunction with a numerically expressed rating to identify reviews expressing a positive sentiment. Positive phrases including one of the specified keywords may be identified in reviews expressing a positive sentiment.

Still referring to FIG. 14, process 1400 is further shown to include extracting one or more portions of the reviews including one or more of the identified positive phrases (step 1408). Step 1408 may involve searching the reviews for a "snippet" (e.g., phrase, text string, portion, etc.) which, when read in isolation, effectively communicates why the user who submitted the review had a positive experience with the reviewed business, product, or service. The snippet may include one or more of the positive phrases identified in step 1406.

In some implementations, process 1400 further includes presenting the extracted portions of the reviews to a content requestor and receiving an input from the content requestor selecting one or more of the extracted portions (step 1410). The content requestor may approve or reject the extracted text snippets. Advantageously, the input received from content requestors (e.g., approving or rejecting content items) may complete a feedback loop for adaptively designing, configuring, or generating content items. If approved, the extracted text may be assembled into a content item (step 1412). In some implementations, the extracted text may be used as a textual portion (e.g., textual description, headline, etc.) of a content item which also includes images, colors, or other non-textual elements (e.g., a display content item). In other implementations, the extracted text may be part of a purely textual content item (e.g., a textual "creative").

Figure 15:
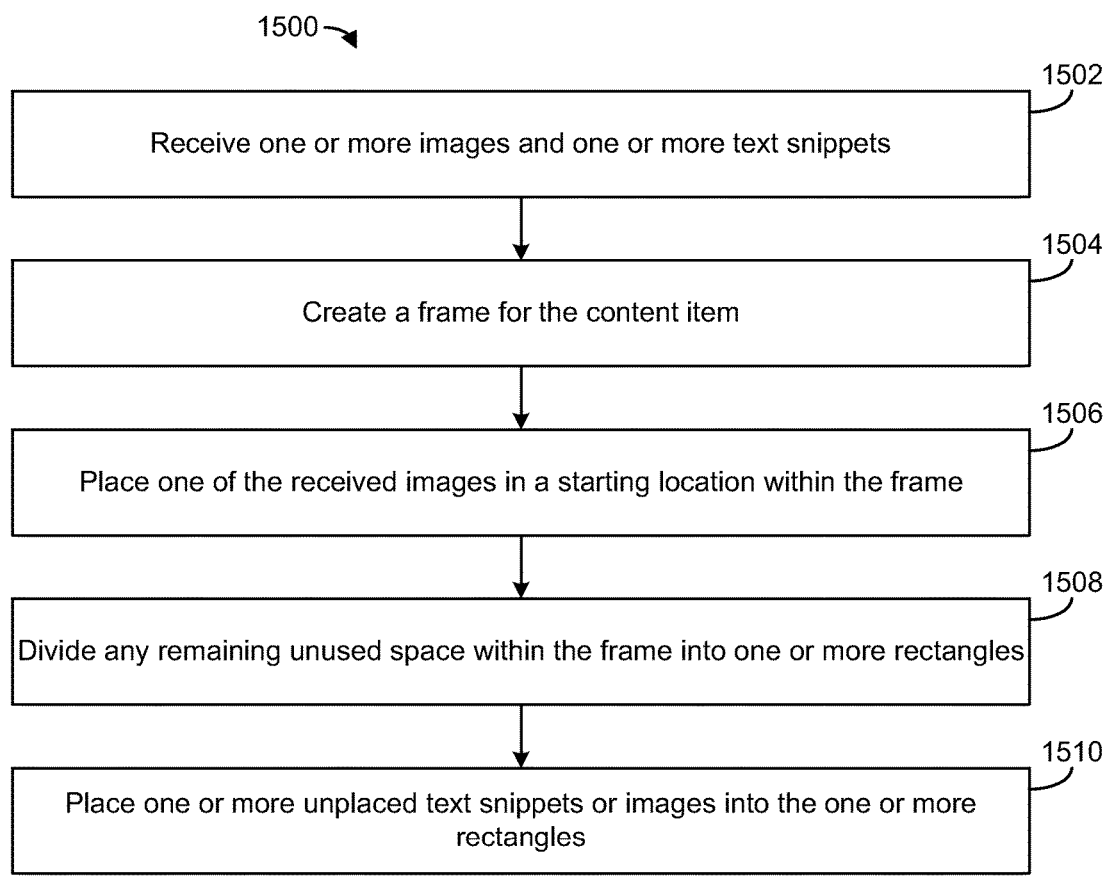
FIG. 15 is a flowchart of a process for generating unique-looking layouts for content items based on the images, text, colors, and fonts extracted from a landing resource, according to a described implementation.

Referring now to FIG. 15, a flowchart of a process 1500 for automatically generating unique-looking layouts for a content item is shown, according to a described implementation. Process 1500 may be used to accomplish steps 1308 and 1310 of process 1300. For example, once a set of images, text snippets, fonts, and colors have been extracted from the landing resource, process 1500 may be used to assemble the images, text snippets, colors, and fonts into a completed content item.

Process 1500 is shown to include receiving one or more images and one or more text snippets (step 1502). In some implementations, step 1502 may further include receiving one or more fonts and one or more colors in addition to the received images and text snippets. Images may be received with a classification tag specifying whether the image is a logo image, a product/prominent image, or whether the image belongs to any other category of images. Each of the received images may include attribute information (e.g., a display height, a display width, a list of dominant colors in the image, etc.) Each of the received text snippets may include a length attribute. The length attribute may specify a display size for the text snippet and may depend on the font (e.g., font size, font family, etc.) used in conjunction with the text snippet. In some implementations, images, text snippets, colors, and fonts may be received along with a score, ranking, weight, or other scoring metric. The score associated with each element may be used to determine a priority or order in which the elements are selected for inclusion in the generated content item.

Still referring to FIG. 15, process 1500 is shown to further include creating a frame for the content item (step 1504). The frame for the content item may be a rectangular or non-rectangular frame corresponding to the dimensions (e.g., display height, display width, etc.) of the content item. In some implementations, step 1504 may involve creating multiple frames corresponding to multiple potential display sizes or dimensions for the completed content item. For example, several differently sized content items may be generated using several differently sized frames.

Process 1500 is further shown to include placing one of the received images in a starting location within the frame (step 1506). The image selected for initial placement may be chosen based on the score assigned to the image (e.g., the highest scoring image), the display size of the image, a classification of the image (e.g., logo, product, other prominent image), or a predicted score based on how well the image coordinates with the text snippets, colors, and/or fonts also potentially included in the content item. The initial image may be placed in a corner (e.g., top left, top right, bottom left, bottom right), edge (e.g., top, bottom, left, right), or middle of the frame (e.g., not along an edge or corner).

Still referring to FIG. 15, process 1500 is shown to further include dividing any remaining unused space within the frame into one or more rectangles (step 1508). The amount of space remaining may be based on the display size and/or position of the initial image placed within the frame in step 1506. In some implementations, one or more of the rectangles may be combined into a larger rectangle based on the display sizes or aspect ratios of the remaining unused text snippets and images. For example, if an unused image has a display height attribute (e.g., pixels, inches, etc.) which exceeds the unused image's display width attribute (i.e., a "portrait-style" image), rectangles may be combined to create a "portrait-style" space into which the image may be placed. Advantageously, the unused space may be allocated as necessary to accommodate the aspect ratios or display sizes of the remaining unused images as well as the lengths of any unused text snippets.

Process 1500 is shown to further include placing one or more of the unplaced text snippets or images into the one or more rectangles (step 1510). In some implementations, the selected images and text snippets may be cropped or resized to fit within designated placeholders in the generated layout. In other implementations, the placeholders may be resized, moved, or re-arranged to accommodate the selected images and/or text. The images and text snippets selected for placement into the one or more rectangles may be based on the display sizes of the images, the display length of the text snippets, and/or the scores assigned to each of the unused images and text snippets.

In some implementations, step 1510 may include applying the received colors and fonts to the generated layout. The received colors may be applied to the layout as background colors, text colors, button colors, translucent text box shading colors, border colors, or any other color visible in the generated content item. The received fonts may be applied to the text snippets placed within the frame, a headline text, button text, or any other text displayed in the generated content item.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially-generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application-specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD-ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front-end component (e.g., a client computer) having a graphical user interface or a web browser through which a user may interact with an implementation of the subject matter described in this disclosure, or any combination of one or more such back-end, middleware, or front-end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products embodied on one or more tangible media.

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for generating a layout for a content item, the method comprising:
   obtaining a plurality of images and a plurality of text snippets;
   creating, by one or more processors, a frame for the content item;
   calculating automatically, by the one or more processors, a score for each of the plurality of images based on a value proportional to a distance between a center of the respective image and a horizontal center of a landing resource;
   selecting, by the one or more processors, an image of the plurality of images having a highest score;
   placing, by the one or more processors, the selected image having the highest score in a starting location within the frame of the content item;
   dividing, by the one or more processors, a remaining unused space within the frame into a plurality of rectangles, at least one of the plurality of rectangles having a dimension corresponding to a dimension of the placed image;
   combining, by the one or more processors, two or more rectangles of the plurality of rectangles in the remaining unused space to create a combined rectangle having a dimension accommodating a dimension of an unplaced image or text snippet of the obtained images and text snippets; and
   placing, by the one or more processors, the unplaced image or text snippet into the combined rectangle.

2. The method of claim 1, wherein combining the two or more rectangles further comprises:
   combining a first rectangle that is either horizontally adjacent or vertically adjacent to the location of the placed image with a second rectangle that is diagonally adjacent to the location of the placed image.

3. The method of claim 1, wherein obtaining the plurality of images and the plurality of text snippets further comprises:
   receiving a uniform resource locator specifying a landing resource; and
   extracting the plurality of images and the plurality of text snippets from the landing resource.

4. The method of claim 3, wherein extracting the plurality of images and the plurality of text snippets from the landing resource further comprises rendering the landing resource and generating a document object model tree based on the rendered resource.

5. The method of claim 1, wherein obtaining the plurality of images and the plurality of text snippets further comprises retrieving the plurality of images and the plurality of text snippets from a database.

6. The method of claim 1, wherein each of the plurality of images has respective associated metadata, and wherein calculating the score of each of the plurality of images further comprises calculating each score based on predetermined scores corresponding to each keyword in the metadata associated with the respective image.

7. The method of claim 6, wherein the metadata includes at least one of a URL, a display position, a display size, or alt text.

8. The method of claim 1, wherein calculating the score of each of the plurality of images further comprises calculating each score based on a display size of the respective image and a vertical placement of the respective image on a landing resource.

9. The method of claim 1, wherein placing the unplaced image or text snippet into the combined rectangle further comprises:
   resizing the unplaced image or text snippet to fit the combined rectangle.

10. A system for generating a layout for a content item, the system comprising:
    an image extractor, executed by a processor of a computing device, configured to obtain a plurality of images and a plurality of text snippets; and
    a layout module, executed by the processor, configured to:
    create a frame for the content item,
    calculate automatically a score for each of the plurality of images based on a value proportional to a distance between a center of the respective image and a horizontal center of a landing resource,
    select an image of the plurality of images having a highest score,
    place the selected image having the highest score in a starting location within the frame of the content item,
    divide a remaining unused space within the frame into a plurality of rectangles such that at least one rectangle of the plurality of rectangles has a dimension equal to a dimension of the placed image;
    combine two or more rectangles of the plurality of rectangles in the remaining unused space to create a combined rectangle having a dimension accommodating a dimension of an unplaced image or text snippet of the obtained images and text snippets, and
    place the unplaced image or text snippet into the combined rectangle.

11. The system of claim 10, wherein the layout module is further configured to:
    combine a first rectangle that is either horizontally adjacent or vertically adjacent to the location of the placed image with a second rectangle that is diagonally adjacent to the location of the placed image.

12. The system of claim 10, wherein the image extractor is further configured to:
    receive a uniform resource locator specifying a landing resource; and
    extract the plurality of images and the plurality of text snippets from the landing resource.

13. The system of claim 10, further comprising a resource renderer configured to:
    render the landing resource and generate a document object model tree based on the rendered resource.

14. The system of claim 10, wherein the image extractor is further configured to retrieve the plurality of images and the plurality of text snippets from a database.

15. The system of claim 10, wherein each of the plurality of images has respective associated metadata, and wherein the layout module is further configured to calculate the score of each of the plurality of images based on predetermined scores corresponding to each keyword in the metadata associated with the respective image.

16. The system of claim 15, wherein the metadata includes at least one of a URL, a display position, a display size, or alt text.

17. The system of claim 10, wherein the layout module is further configured to calculate the score of each of the plurality of images based on a display size of the respective image and a vertical placement of the respective image on a landing resource.

18. The system of claim 10, wherein the layout module is further configured to resize the unplaced image or text snippet to fit the combined rectangle.

* * * * *